United States Patent
Kankani et al.

(10) Patent No.: US 9,639,282 B2
(45) Date of Patent: May 2, 2017

(54) VARIABLE BIT ENCODING PER NAND FLASH CELL TO IMPROVE DEVICE ENDURANCE AND EXTEND LIFE OF FLASH-BASED STORAGE DEVICES

(71) Applicant: SanDisk Enterprise IP LLC, Milpitas, CA (US)

(72) Inventors: Navneeth Kankani, Fremont, CA (US); Linh Tien Truong, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 2 days.

(21) Appl. No.: 14/929,166

(22) Filed: Oct. 30, 2015

(65) Prior Publication Data
US 2016/0342345 A1    Nov. 24, 2016

Related U.S. Application Data

(60) Provisional application No. 62/164,473, filed on May 20, 2015.

(51) Int. Cl.
*G06F 12/10* (2016.01)
*G06F 3/06* (2006.01)

(52) U.S. Cl.
CPC .......... *G06F 3/0616* (2013.01); *G06F 3/0634* (2013.01); *G06F 3/0638* (2013.01); *G06F 3/0688* (2013.01)

(58) Field of Classification Search
CPC ... G06F 12/0246; G06F 3/0616; G06F 3/0638
(Continued)

(56) References Cited

U.S. PATENT DOCUMENTS 6,018,304 A    1/2000  Bessios
6,070,074 A    5/2000  Perahia et al.
(Continued)

FOREIGN PATENT DOCUMENTS

EP    2447842 A1    5/2012
WO    WO 2007/036834    4/2007
(Continued)

OTHER PUBLICATIONS

International Search Report and Written Opinion dated May 23, 2013, received in International Patent Application No. PCT/US2012/065914, which corresponds to U.S. Appl. No. 13/679,963, 7 pgs (Frayer).

(Continued)

*Primary Examiner* — Jae Yu
(74) *Attorney, Agent, or Firm* — Morgan, Lewis & Bockius LLP

(57) ABSTRACT

Systems, methods, and/or devices are used to implement variable bit encoding to improve device endurance and extend life of storage devices. In some embodiments, the method includes detecting a trigger condition with respect to one or more non-volatile memory portions (e.g., portions configured to store data encoded in a first encoding format) of a plurality of non-volatile memory portions of a storage device. In accordance with detecting the trigger condition, the method includes: determining a current and an estimated endurance metric for the plurality of non-volatile memory portions (e.g., corresponding to estimated endurance after reconfiguration of the one or more portions to store data encoded in a second encoding format), and in accordance with a determination that reconfiguration criteria are satisfied (e.g., the estimated endurance metric comprises an improvement over the current endurance metric), reconfig- (Continued)

uring the one or more portions to store data encoded in the second encoding format.

20 Claims, 12 Drawing Sheets

(58) Field of Classification Search
USPC .......................................................... 711/103
See application file for complete search history.

(56) References Cited

U.S. PATENT DOCUMENTS

| | | | |
|---|---|---|---|
| 6,138,261 | A | 10/2000 | Wilcoxson et al. |
| 6,182,264 | B1 | 1/2001 | Ott |
| 6,192,092 | B1 | 2/2001 | Dizon et al. |
| 6,516,437 | B1 | 2/2003 | Van Stralen et al. |
| 7,685,494 | B1 | 3/2010 | Varnica et al. |
| 7,954,041 | B2 | 5/2011 | Hong et al. |
| 7,974,368 | B2 | 7/2011 | Shieh et al. |
| 8,006,161 | B2 | 8/2011 | Lestable et al. |
| 8,069,390 | B2 | 11/2011 | Lin |
| 8,190,967 | B2 | 5/2012 | Hong et al. |
| 2004/0146006 | A1* | 7/2004 | Jackson ............ H04L 12/2602 370/230 |
| 2005/0094459 | A1 | 5/2005 | Sesek et al. |
| 2005/0172207 | A1 | 8/2005 | Radke et al. |
| 2007/0157064 | A1 | 7/2007 | Falik et al. |
| 2008/0086677 | A1 | 4/2008 | Yang et al. |
| 2008/0168319 | A1 | 7/2008 | Lee et al. |
| 2008/0195900 | A1 | 8/2008 | Chang et al. |
| 2009/0144598 | A1 | 6/2009 | Yoon et al. |
| 2009/0222708 | A1 | 9/2009 | Yamaga |
| 2011/0202818 | A1 | 8/2011 | Yoon et al. |
| 2012/0079229 | A1 | 3/2012 | Jensen et al. |
| 2012/0192035 | A1 | 7/2012 | Nakanisi |
| 2012/0290899 | A1 | 11/2012 | Cideciyan et al. |
| 2012/0317463 | A1 | 12/2012 | Sugahara et al. |
| 2013/0346671 | A1 | 12/2013 | Michael et al. |
| 2014/0136927 | A1 | 5/2014 | Li et al. |
| 2014/0229799 | A1 | 8/2014 | Hubris et al. |

FOREIGN PATENT DOCUMENTS

| | | |
|---|---|---|
| WO | WO 2009/028281 | 3/2009 |
| WO | WO 2009/032945 | 3/2009 |

OTHER PUBLICATIONS

Office Action dated Nov. 4, 2015 received in European Patent Application No. 12808940.6, which corresponds to U.S. Appl. No. 13/679,963, 4 pages (Frayer).

International Search Report and Written Opinion dated Apr. 5, 2013, received in International Patent Application No. PCT/US2012/065916, which corresponds to U.S. Appl. No. 13/679,969, 7 pgs (Frayer).

Office Action dated Nov. 3, 2015 received in European Patent Application No. 12806217.1, which corresponds to U.S. Appl. No. 13/679,969, 4 pages (Frayer).

Office Action dated Nov. 2, 2015 received in European Patent Application No. 12805828.6, which corresponds to U.S. Appl. No. 13/679,970, 5 pages (Frayer).

International Search Report and Written Opinion dated Jun. 17, 2013, received in International Patent Application No. PCT/US2012/065919, which corresponds to U.S. Appl. No. 13/679,970, 8 pgs (Frayer).

International Search Report and Written Opinion dated Sep. 30, 2016, received in International Patent Application No. PCT/US2016/026052, which corresponds to U.S. Appl. No. 14/929,148, 18 pages (Olbrich).

* cited by examiner

| Endurance Estimation Table 226 | Status Metric | Endurance Estimate for TLC | Endurance Estimate for MLC | Endurance Estimate for SLC |
|---|---|---|---|---|
| Header 402-0 | Status Metric | Endurance Estimate for TLC | Endurance Estimate for MLC | Endurance Estimate for SLC |
| Record 402-1 | Metric-1 | 300/ 100% | 5000/ 100% | 20000/ 100% |
| Record 402-2 | Metric-2 | 250/ 83% | 4500/ 90% | 19800/ 99% |
| ... | ... | ... | ... | ... |
| Record 402-n | Metric-n | 0/ 0% | 2000/ 40% | 15000/ 75% |
| ... | ... | ... | ... | ... |
| Record 402-last | Metric-last | 0/ 0% | 0/ 0% | 0/ 0% |

Figure 4

VARIABLE BIT ENCODING PER NAND FLASH CELL TO IMPROVE DEVICE ENDURANCE AND EXTEND LIFE OF FLASH-BASED STORAGE DEVICES

RELATED APPLICATIONS

This application claims priority to U.S. Provisional Patent Application No. 62/164,473, filed May 20, 2015, which is incorporated by reference in its entirety.

This application is related to U.S. Provisional Patent Application No. 62/164,470, filed May 20, 2015, which is incorporated by reference in its entirety. This application is also related to U.S. patent application Ser. No. 14/321,701, filed Jul. 1, 2014, which claims priority to U.S. Provisional Patent Application No. 62/005,908, filed May 30, 2014, each of which is hereby incorporated by reference in its entirety.

TECHNICAL FIELD

The disclosed embodiments relate generally to memory systems, and in particular, to variable bit encoding per NAND flash cell to extend the life of a flash-based storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Some flash memory cells store multiple bits of data (multi-level cell, "MLC"), enhancing data storage density as compared to single-level cells (SLC) that store one bit of data. However, as a number of bits stored per cell increases, bit errors in stored data typically increase and, additionally, an MLC flash memory device or MLC memory portion of a flash memory device wears faster and reaches end-of-life conditions faster than an SLC flash memory device or SLC memory portion of a flash memory device. Therefore, MLC flash memory devices are typically retired or removed from a storage system earlier than SLC flash memory devices.

SUMMARY

Without limiting the scope of the appended claims, after considering this disclosure, and particularly after considering the section entitled "Detailed Description" one will understand how the aspects of various embodiments are implemented and used to extend the life of flash-based storage devices by using variable bit encoding per NAND flash cell. In some embodiments, a storage controller is configured to perform operations with or on a storage device (e.g., with one or more flash memory devices). In some embodiments, the storage controller, in response to detecting a trigger condition (e.g., the bit error rate for one or more NVM portions is detected to be above a predefined threshold), reconfigures one or more non-volatile memory portions for a first storage density (e.g., 2 bits per cell) to a lower, second storage density (e.g., 1 bit per cell). As a result, overall or mean endurance of the storage device as a whole is improved. In some implementations, the storage controller reconfigures the one or more non-volatile memory portions only if over-provisioning levels in the storage device will remain sufficient to continue performing background management processes (e.g., garbage collection) that are needed to keep the storage device functioning effectively. In some implementations, the storage controller reconfigures the one or more non-volatile memory portions only if the reconfiguration will improve the overall or mean endurance of the storage device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 4 is a block diagram illustrating a data structure (e.g., an endurance estimation table) for storing endurance estimates for different encoding formats based on various status metrics, in accordance with some embodiments.

Figure 1:
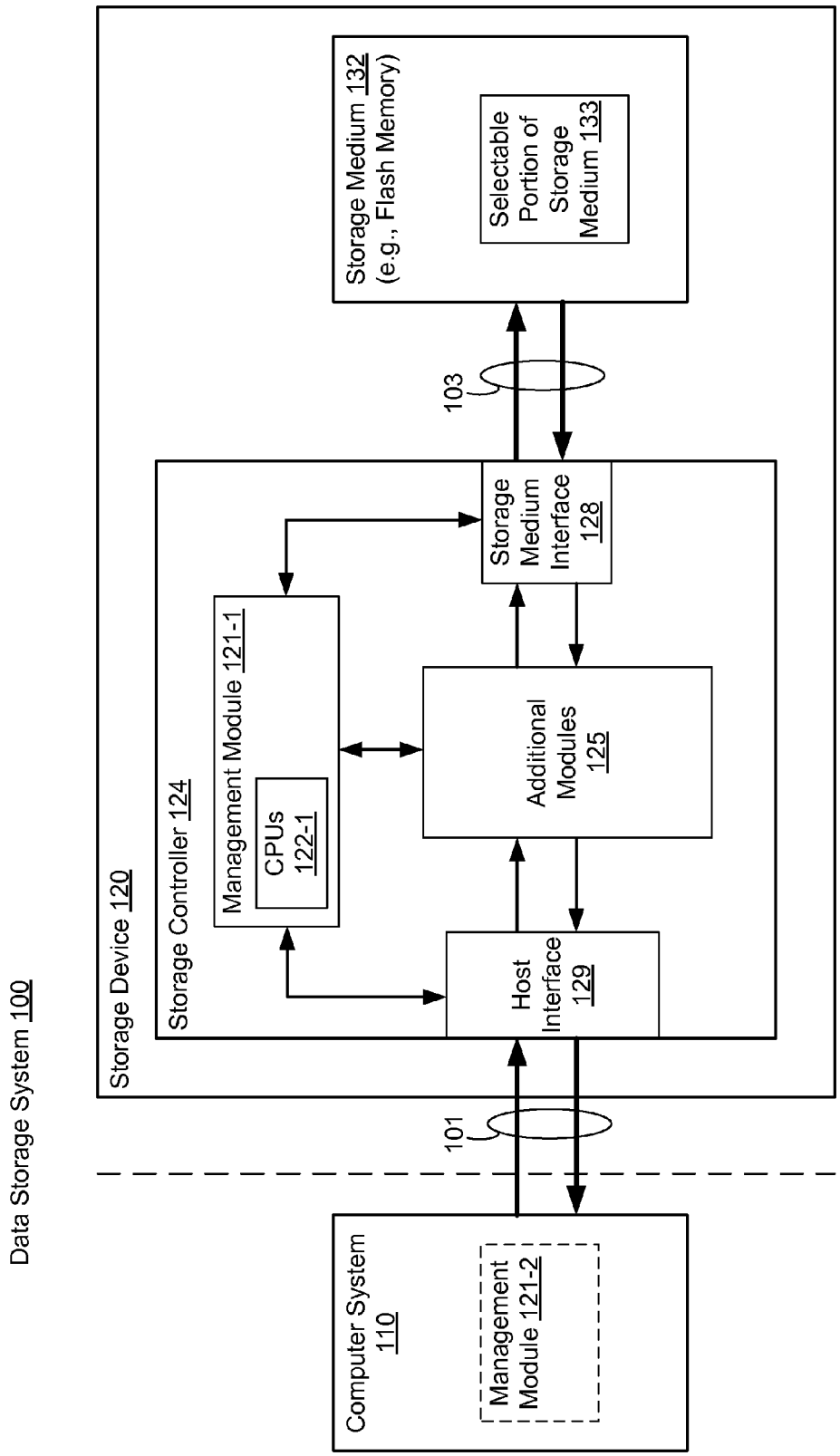
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

When a portion of a storage device reaches end-of-life conditions for a first storage density (e.g., MLC), the portion of the storage device, in some embodiments, has not yet reached end-of-life conditions for a second storage density (e.g., SLC). Thus, the portion of the storage device, in some embodiments, is retired or removed from the storage device earlier than is necessary (because the portion of the storage device is still usable at the second storage density). Consequently, what is desired are mechanisms for proactively processing storage density reconfigurations, in order to prolong the life of flash-based storage devices.

Sometimes herein, a memory cell configured to store 1 bit is referred to as an X1 or SLC memory cell, a memory cell configured to store 2 bits is referred to as an X2 or MLC memory cell, and a memory cell configured to store 3 bits is referred to as an X3 or TLC memory cell. Additionally, a retired memory cell, which is not available for further programming, is referred to as an X0 memory cell. Furthermore, sometimes X3, X2, and X1 are used to indicate levels of storage density: X3 (three bits per memory cell), X2 (two bits per memory cell) and X1 (one bit per memory cell).

The various implementations described herein include systems, devices, and/or methods that may improve the reliability with which data can be retained by a storage device (e.g., a flash memory device). Some implementations include systems, devices, and/or methods to reconfigure at least a portion of a memory device from a first storage density to a second storage density (e.g., from X2 to X1) so as to maximize the life of the portion of the memory device and the memory device itself. In some implementations, the memory cells of a memory device, or a portion of the memory device, are reconfigured from X2 to X1 after reaching end-of-life conditions while the memory cells are operating as X2 memory cells, so as to extend the operating life of the memory device.

(A1) More specifically, some embodiments include a method of operation in a storage device that includes a storage controller (e.g., the storage controller has one or more physical processors and memory) and a plurality of non-volatile memory portions in one or more memory devices. The method includes detecting a trigger condition with respect to one or more non-volatile memory portions of the plurality of non-volatile memory portions. The one or more non-volatile memory portions are configured to store data encoded in a first encoding format and having a first storage density (e.g., TLC or MLC) corresponding to the first encoding format. In response to detecting the trigger condition, and in accordance with a first determination that a projected amount of over-provisioning meets predefined over-provisioning criteria, the method includes reconfiguring the one or more non-volatile memory portions of the storage device to store data encoded in a second encoding format and having a second storage density (e.g., SLC) corresponding to the second encoding format. The projected amount of over-provisioning corresponds to over-provisioning for the storage device after (e.g., that would result from) reconfiguring the one or more non-volatile memory portions of the storage device to store data encoded in the second encoding format and having the second storage density.

(A2) In some embodiments of the method of A1, the second storage density is a lower storage density than the first storage density (e.g., 1 bit per cell at the second encoding format and 3 bits per cell at the first storage density), and the storage device has reduced over-provisioning after the reconfiguring.

(A3) In some embodiments of the method of any one of A1 to A2, the method further includes determining an estimated endurance metric for the plurality of non-volatile memory portions of the storage device, corresponding to an estimated endurance for the plurality of non-volatile memory portions of the storage device after (e.g., that would result from) the reconfiguring. In some embodiments, reconfiguring the one or more non-volatile memory portions of the storage device further includes reconfiguring the one or more non-volatile memory portions of the storage device to store data encoded in the second encoding format and having the second storage density in accordance with the first determination that the projected amount of over-provisioning meets the predefined over-provisioning criteria and in accordance with a second determination that the estimated endurance metric indicates an improvement over the current endurance metric in accordance with predefined endurance improvement criteria (e.g., the estimated endurance metric is greater than the current endurance metric).

(A4) In some embodiments of the method of A3, the current endurance metric for the plurality of non-volatile memory portions corresponds to an average value of an endurance metric with respect to the plurality of non-volatile memory portions, and the estimated endurance metric for the plurality of non-volatile memory portions of the storage device corresponds to a projected average value of the endurance metric with respect to the plurality of non-volatile memory portions after the reconfiguring.

(A5) In some embodiments of the method of A4, the endurance metric with respect to a single memory portion of the plurality of non-volatile memory portions is a value corresponding to a projected number of write operations that can be performed, prior to end of life, by the single memory portion, or a projected number of program/erase cycles that can be performed, prior to end of life, by the single memory portion.

(A6) In some embodiments of the method of any one of A1 to A5, the method further includes maintaining one or more status metrics for each memory portion of the plurality of non-volatile memory portions of the storage device. A respective status metric for a respective memory portion corresponds to the respective memory portion's ability to retain data. In some embodiments, detecting the trigger condition includes in accordance with a determination that at least one of the one or more status metrics for the one or more non-volatile memory portions of the storage device satisfies (e.g., is below) a threshold, detecting the trigger condition as to the one or more non-volatile memory portions of the storage device.

(A7) In some embodiments of the method of any one of A1 to A6, the method further includes maintaining one or more status metrics for each of the one or more memory devices. A first status metric of the one or more status metrics corresponds to a respective memory device's ability to retain data. In accordance with a determination that the one or more status metrics for a respective memory device of the one or more memory devices satisfy one or more end-of-life criteria, the method includes operating the respective memory device in read-only mode.

(A8) In some embodiments of the method of any one of A1 to A7, the one or more memory devices comprise one or more flash memory devices.

(A9) In some embodiments of the method of any one of A1 to A8, the projected amount of over-provisioning represents a first quantity of storage units in the storage device, including mapped storage units remaining after reconfiguring the one or more non-volatile memory portions and unmapped storage units that are usable for storing data and that are remaining after reconfiguring the one or more non-volatile memory portions, and subtracting from the first quantity a quantity corresponding to a declared storage capacity of the storage device.

(A10) In another aspect, a storage device includes (1) a set of one or more non-volatile memory devices, the set of one or more non-volatile memory devices including a plurality of non-volatile memory portions and (2) a storage controller, the storage controller including one or more controller modules. The one or more controller modules are configured to detect a trigger condition with respect to one or more non-volatile memory portions of the storage device. The one or more non-volatile memory portions are configured to store data encoded in a first encoding format having a first storage density (e.g., TLC or MLC) corresponding to the first encoding format. In response to detecting the trigger condition, and in accordance with a first determination that a projected amount of over-provisioning meets predefined over-provisioning criteria, the one or more controller modules are configured to reconfigure the one or more non-volatile memory portions of the storage device to store data encoded in a second encoding format and having a second storage density (e.g., SLC) corresponding to the second encoding format. The projected amount of over-provisioning corresponds to over-provisioning for the storage device after (e.g., that would result from) reconfiguring the one or more non-volatile memory portions of the storage device to store data encoded in the second encoding format and having the second storage density.

(A11) In some embodiments of the storage device of A10, the one or more controller modules include: (1) a trigger condition module to detect the trigger condition and (2) a reconfiguration module to reconfigure the one or more non-volatile memory portions of the storage device in response to the trigger condition and in accordance with the first determination.

(A12) In some embodiments of the storage device of A11, the one or more controller modules further include an over-provisioning module to determine the projected amount of over-provisioning remaining for the storage device after reconfiguring the one or more non-volatile memory portions of the storage device to store data encoded in the second encoding format and having the second storage density.

(A13) In some embodiments of the storage device of A10, the projected amount of over-provisioning meets the predefined over-provisioning criteria only when the projected amount of over-provisioning is greater than a predetermined minimum amount of over-provisioning for the storage device.

(A14) In some embodiments of the storage device of A10 to A13, the storage device is further configured to perform the method of any one of A2 to A9 described above.

(A15) In an additional aspect, a storage device includes: (1) a set of one or more non-volatile memory devices, the set of one or more non-volatile memory devices including a plurality of non-volatile memory portions; (2) means for detecting a trigger condition with respect to one or more non-volatile memory portions of the plurality of non-volatile memory portions (e.g., the one or more non-volatile memory portions are configured to store data encoded in a first encoding format and having a first storage density corresponding to the first encoding format); (3) means for determining a projected amount of over-provisioning remaining for the storage device after reconfiguring the one or more non-volatile memory portions to store data encoded in a second encoding format and having a second storage density that corresponds to the second encoding format and is different from the first storage density; and (4) means for reconfiguring, in response to detecting the trigger condition, and in accordance with a first determination that a projected amount of over-provisioning meets predefined over-provisioning criteria, the one or more non-volatile memory portions so as to store data encoded in the second encoding format and having the second storage density. The one or more reconfigured non-volatile memory portions have a reduced storage capacity.

(A16) In some embodiments of the storage device of A15, the storage device further includes means for performing the method of any one of A2 to A9 described above.

(A17) In yet one further aspect, a non-transitory computer-readable storage medium is provided. The non-transitory computer-readable storage medium stores one or more programs configured for execution by one or more processors of a storage device, the one or more programs including instructions for performing the method of any one of A1 to A9 described above.

(B1) In another aspect, a method of operation in a storage device that includes a storage controller (e.g., the storage controller has one or more physical processors and memory) and a plurality of non-volatile memory portions in one or more memory devices, includes detecting a trigger condition with respect to one or more non-volatile memory portions of the storage device. The one or more non-volatile memory portions are configured to store data encoded in a first encoding format and having a first storage density corresponding to the first encoding format. The method includes, in accordance with detecting the trigger condition: (1) determining a current endurance metric for the plurality of non-volatile memory portions of the storage device; (2) determining an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density corresponding to the second encoding format; and (3) in accordance with a determination that reconfiguration criteria are satisfied, reconfiguring the one or more non-volatile memory portions of the storage device to store data encoded in the second encoding format and having the second storage density. In some embodiments, the reconfiguration criteria include a determination that the estimated endurance metric comprises an improvement over the current endurance metric in accordance with predefined endurance improvement criteria.

(B2) In some embodiments of the method of B1, the second storage density is a lower storage density than the first storage density (e.g., 1 bit per cell at the second encoding format and 3 bits per cell at the first storage density).

(B3) In some embodiments of the method of any one of B1 or B2, the current endurance metric for the plurality of non-volatile memory portions corresponds to an average value of an endurance metric with respect to the plurality of non-volatile memory portions, and the estimated endurance metric for the plurality of non-volatile memory portions of the storage device corresponds to a projected average value of the endurance metric with respect to the plurality of non-volatile memory portions after the reconfiguring.

(B4) In some embodiments of the method of B3, the endurance metric with respect to a single memory portion of the plurality of non-volatile memory portions is a value corresponding to a projected number of write operations that can be performed, prior to end of life, by the single memory portion, or a projected number of program/erase cycles that can be performed, prior to end of life, by the single memory portion.

(B5) In some embodiments of the method of any one of B1 to B4, the method further includes maintaining one or more status metrics for each memory portion of the plurality of non-volatile memory portions of the storage device. A respective status metric for a respective memory portion corresponds to the respective memory portion's ability to retain data. In these embodiments, detecting the trigger condition includes, in accordance with a determination that at least one of the one or more status metrics for the one or more non-volatile memory portions of the storage device satisfies (e.g., is below) a threshold, detecting the trigger condition as to the one or more non-volatile memory portions of the storage device.

(B6) In some embodiments of the method of any one or B1 to B5, the method further includes maintaining one or more status metrics for each of the one or more memory devices. A first status metric of the one or more status metrics corresponds to a respective memory device's ability to retain data. In these embodiments, the method includes, in accordance with a determination that the one or more status metrics for a respective memory device of the one or more memory devices satisfy one or more end-of-life criteria, operating the respective memory device in read-only mode.

(B7) In some embodiments of the method of any one of B1 to B6, the one or more memory devices include one or more flash memory devices.

(B8) In another aspect, a storage device includes: (1) a set of one or more non-volatile memory devices, the set of one or more non-volatile memory devices including a plurality of non-volatile memory portions and (2) a storage controller, the storage controller including one or more controller modules. The one or more controller modules are configured to detect a trigger condition with respect to one or more non-volatile memory portions of the storage device. The one or more non-volatile memory portions are configured to store data encoded in a first encoding format and having a first storage density corresponding to the first encoding format. The one or more controller modules are further configured to determine an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density corresponding to the second encoding format. The one or more controller modules are also configured to reconfigure, in accordance with a determination that reconfiguration criteria are satisfied, the one or more non-volatile memory portions of the storage device to store data encoded in the second encoding format and having the second storage density, the reconfiguration criteria including a determination that the estimated endurance metric comprises an improvement over the current endurance metric in accordance with predefined endurance improvement criteria.

(B9) In some embodiments of the storage device of B8, the one or more controller modules include: (1) a trigger condition detection module to detect the trigger condition, (2) a metric maintaining module to determine the estimated endurance metric, and (3) a reconfiguration module to reconfigure the one or more non-volatile memory portions of the storage device in response to the trigger condition and in accordance with the determination that the reconfiguration criteria are satisfied.

(B10) In some embodiments of the storage device of any one of B8 or B9, the storage device is further configured to perform the method of any one of B2 to B7 described above.

(B11) In yet one more aspect, a storage device includes: (1) a set of one or more non-volatile memory devices, the set of one or more non-volatile memory devices including a plurality of non-volatile memory portions; (2) means for detecting a trigger condition with respect to one or more non-volatile memory portions of the storage device (e.g., the one or more non-volatile memory portions are configured to store data encoded in a first encoding format and having a first storage density corresponding to the first encoding format); (3) means for determining an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density; and (4) means for reconfiguring, in accordance with a determination that reconfiguration criteria are satisfied, the one or more non-volatile memory portions of the storage device to store data encoded in the second encoding format and having the second storage density, the reconfiguration criteria including a determination that the estimated endurance metric comprises an improvement over the current endurance metric in accordance with predefined endurance improvement criteria.

(B12) In some embodiments of the storage device of B11, the storage device further comprises means for performing the method of any one of B2 to B7 described above.

(B13) In yet one further aspect, a non-transitory computer-readable storage medium is provided. The non-transitory computer-readable storage medium stores one or more programs configured for execution by one or more processors of a storage device, the one or more programs including instructions for performing the method of any one of B1 to B7 described above.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 132 is divided into a number of addressable and individually selectable blocks, such as selectable portion 133. In some embodiments, the individually selectable blocks are the minimum size erasable units in a flash memory device. In other words, each block contains the minimum number of memory cells that can be erased without erasing any other memory cells in the same flash memory device. Typically, when a flash memory block is erased, all memory cells in the block are erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. For example, in some implementations, each block includes a number of pages, such as 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 132.

Additionally, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, an MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

The encoding format of the storage media (i.e., TLC, MLC, or SLC and/or a chosen data redundancy mechanism) is a choice made when data is actually written to the storage media. Often in this specification there is described an event, condition, or process that is said to set, trigger reconfiguration of, or alter the encoding format of the storage media, etc. It should be recognized that the actual process may involve multiple steps, e.g., erasure of the previous contents of the storage media followed by the data being written using the new encoding format and that these operations may be separated in time from the initiating event, condition or procedure.

In some embodiments (and as explained in more detail in reference to FIGS. 6, 7A-7C, and 8A-8B below), detecting a trigger condition is said to trigger a process for determining whether to reconfigure one or more NVM portions of a plurality of NVM portions (e.g., one or more die plane, superblocks, blocks, or pages) of a storage device to a new encoding format. In some embodiments, the trigger condition is detected with respect to the one or more NVM portions in accordance with one or more status metrics (e.g., one or more performance metrics corresponding to performance of the storage device, one or more endurance/wear metrics corresponding to wear on the storage device, and/or one or more time metrics). Status metrics of the storage device include metrics (e.g., wear metrics such as program-erase (P/E) cycle counts, write operation counts, and the like) of the non-volatile storage media (e.g., storage medium 132, FIG. 1) of the storage device, but are not necessarily limited to such metrics. For example, some metrics (e.g., some performance metrics, such as latency metrics, metrics that measure how long it takes or how many operations are required to complete a write or erase operation, etc.) of the storage device reflect both storage media performance as well as controller and/or other storage device component performance.

In some embodiments, the storage device keeps track of (i.e., determines and/or maintains) a number of status metrics. In some embodiments, the status metrics tracked by the storage device include a write amplification metric of the storage device. In some embodiments, the status metrics tracked by the storage device include an over-provisioning metric (e.g., the percentage of total storage capacity that is in excess of the declared capacity of the storage device), and a projected over-provisioning metric (e.g., the projected or estimated percentage of total storage capacity that is in excess of the declared capacity of the storage device after a projected conversion of a number of memory blocks (or other portions of the storage device) from a current encoding format (e.g., TLC, MLC and/or data redundancy mechanism) to a lower storage density encoding (e.g., MLC, SLC and/or data redundancy mechanism)). In some embodiments, reconfiguring NVM portions to an encoding format (e.g., the second encoding format) impacts available over-provisioning of the storage device. In some embodiments, over-provisioning refers to the difference between the physical capacity of the storage device (e.g., the physical capacity less capacity set aside for management data structures and metadata) for storing user data (e.g., data stored in the storage system on behalf of a host or host system), and the logical capacity presented as available for use by a host or user. For example, in some embodiments, if a non-volatile memory of a storage device has 12 GB of total storage capacity (e.g., total storage capacity for storing user data) and 10 GB of declared capacity, then the non-volatile memory of the storage device has 2 GB of over-provisioning. Unlike declared capacity, which is the storage capacity available to a host, the extra capacity of over-provisioning is not visible to the host as available storage. Instead, over-provisioning is used to increase endurance of a storage device (e.g., by distributing the total number of writes and erases across a larger population of blocks and/or pages over time), improve performance (e.g., by providing additional buffer space for managing P/E cycles and improving the probability that a write operation will have immediate access to a pre-erased block), and reduce write amplification.

Write amplification is a phenomenon where the actual amount of physical data written to a storage medium (e.g., storage medium 132 of storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on blocks (sometimes herein called erase blocks) with the fewest number of valid pages for best performance and best write amplification.

Turning back to the discussion of trigger conditions, in some embodiments, the trigger condition is detected in accordance with a single status metric, or a non-linear and/or linear combination of one or more status metrics. For example, in some embodiments, the trigger condition is detected by comparing a wear metric such as P/E cycle counts to a previously determined value, e.g., a threshold value. In some embodiments, the trigger condition can also be asserted by other means, e.g., by a human operator or scheduled by a human operator. For example, it may be desirable to initiate a reconfiguration process because of the expected availability or unavailability of other data storage resources.

In some embodiments, the trigger condition is detected in accordance with historical knowledge of the one or more metrics. For example, historical knowledge can be a running average of one or more metrics. In another example, historical knowledge can be used to determine (e.g., compute) one or more projected values of one or more metrics at a particular time in the future (e.g., an hour, day, week, or month in the future), and the trigger condition can be detected in accordance with the one or more projected values. The latter methodology can be particularly useful for avoiding events that result in loss of data (e.g., due to wear out), or more generally for avoiding events that significantly impact on the quality of service provided by a storage system, and for enabling a storage system to undertake ameliorative measures prior to there being an urgent need to do so. For example, in some embodiments, the trigger condition is detected by comparing a historical wear metric such as P/E cycle counts to a previously determined value to anticipate wear out of a portion of the storage media. Similarly, in some embodiments, the trigger condition is detected by comparing a historical metric, such as the bit error rate (BER), or the rate of change of the metric, BER (of the storage media, or a portion of the storage media), or a projected value (e.g., a projected BER rate at a particular time in the future, as determined based on a current or historical BER and a rate of change of the BER), against a previously-determined value to anticipate performance degradation due to increased computation requirements for error correction.

In a storage device with a plurality of memory devices (e.g., a plurality of storage mediums 132), the trigger condition may be dependent on metrics obtained from a plurality of the memory devices. The reconfiguration process may operate on more than one memory device at a time, either sequentially or in parallel. For example, a storage device may have a fixed maximum rate of capacity reduction independent of how many storage devices are currently being operated on in parallel by the reconfiguration process (e.g., maximum rate of data movement between the storage devices while reducing utilization).

Continuing with the description of FIG. 1, in some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory, as discussed below). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs, processors, microprocessors, or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more central processing units (CPUs, also sometimes called processors, microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125, and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

As data storage densities of non-volatile semiconductor memory devices continue to increase, stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, an error control module, included in additional module(s) 125, includes an encoder and a decoder. In some embodiments, the encoder encodes data by applying an error control code (ECC) to produce a codeword, which is subsequently stored in storage medium 132. When encoded data (e.g., one or more codewords) is read from storage medium 132, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 132 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 132 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, via storage medium interface 128, to obtain raw read data in accordance with memory locations (or logical addresses, object identifiers, or the like) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

Figure 2:
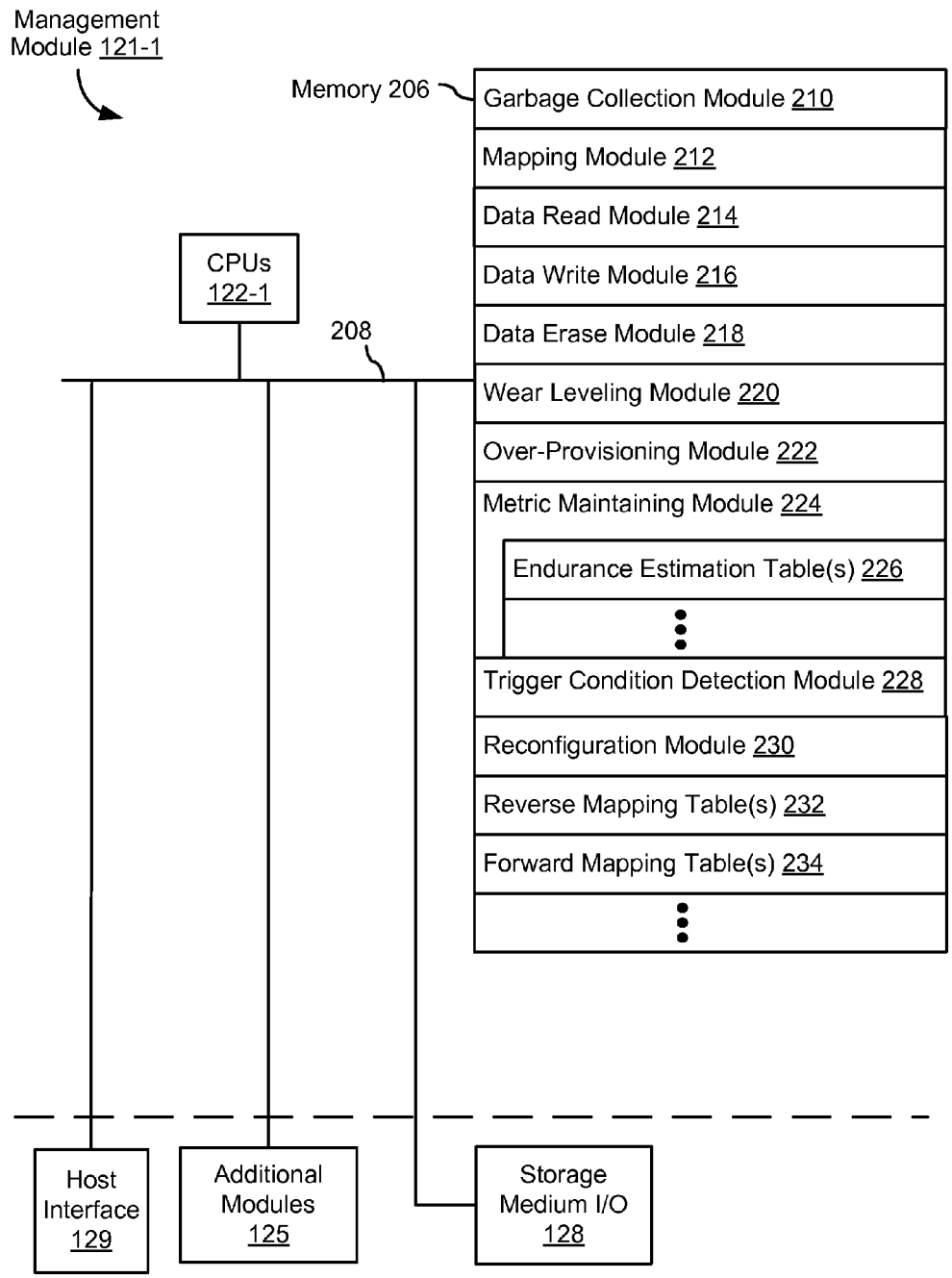
FIG. 2 is a block diagram illustrating an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208.

Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:
- garbage collection module 210 that is used for garbage collection for one or more blocks in a storage medium (e.g., storage medium 132, FIG. 1);
- mapping module 212 that is used for mapping (e.g., using a mapping table) logical addresses (e.g., a logical block address, "LBA") in a logical address space to physical addresses (e.g., physical page numbers, "PPN") in a physical address space, and for maintaining and updating one or more address mapping tables and/or related data structures;
- data read module 214 that is used for reading data from one or more codewords, pages, or blocks in a storage medium (e.g., storage medium 132, FIG. 1);
- data write module 216 that is used for writing data to one or more codewords, pages, or blocks in a storage medium (e.g., storage medium 132, FIG. 1);
- data erase module 218 that is used for erasing data from one or more blocks in a storage medium (e.g., storage medium 132, FIG. 1);
- wear leveling module 220 that is used for determining pages or blocks of a storage device (e.g., storage device 120, FIG. 1) for storing data so as to evenly wear the pages or blocks of the storage device;
- over-provisioning module 222 that is used for monitoring and/or measuring a current amount (or level of) over-provisioning in a storage device (e.g., storage device 120, FIG. 1) and for determining a projected amount of over-provisioning remaining for the storage device after reconfiguring one or more portions (e.g., non-volatile memory portions, such as die plane, superblocks, blocks, or pages) of the storage device;
- metric maintaining module 224 that is used for generating and/or obtaining one or more metrics of a storage device (e.g., storage device 120, FIG. 1A), optionally including:
  - one or more endurance estimation table(s) 226 that is(are) used for storing information about metrics (e.g., status metrics) and corresponding endurance estimates at each available encoding format (e.g., SLC, MLC, and TLC);
- trigger condition detection module 228 that is used for detecting a trigger condition (e.g., in accordance with one or more endurance and/or status metrics of a storage device or of one or more memory portions of the storage device);
- reconfiguration module 230 that is used for reconfiguring one or more portions (e.g., non-volatile memory portions, such as die plane, superblocks, blocks, or pages) of a storage device (e.g., storage device 120, FIG. 1);
- reverse mapping table(s) 232 that is(are) used for translating a physical address in a physical address space (e.g., a physical flash address, such as a physical page number, "PPN") of non-volatile memory in a storage device (e.g., storage device 120, FIG. 1) to a logical address in a logical address space (e.g., an LBA) from the perspective of a host (e.g., computer system 110, FIG. 1) and is also optionally used for storing an encoding format, current endurance metric, status metric(s), and other information (as described in more detail below in reference to FIG. 3A); and
- forward mapping tables 234 that is(are) used for translating a logical address in a logical address space (e.g., an LBA) from the perspective of a host (e.g., computer system 110, FIG. 1) to a physical address in a physical address space (e.g., a "PPN") of non-volatile memory in a storage device (e.g., storage device 120, FIG. 1).

Each of the above identified elements may be stored in one or more of the previously-mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 3A:
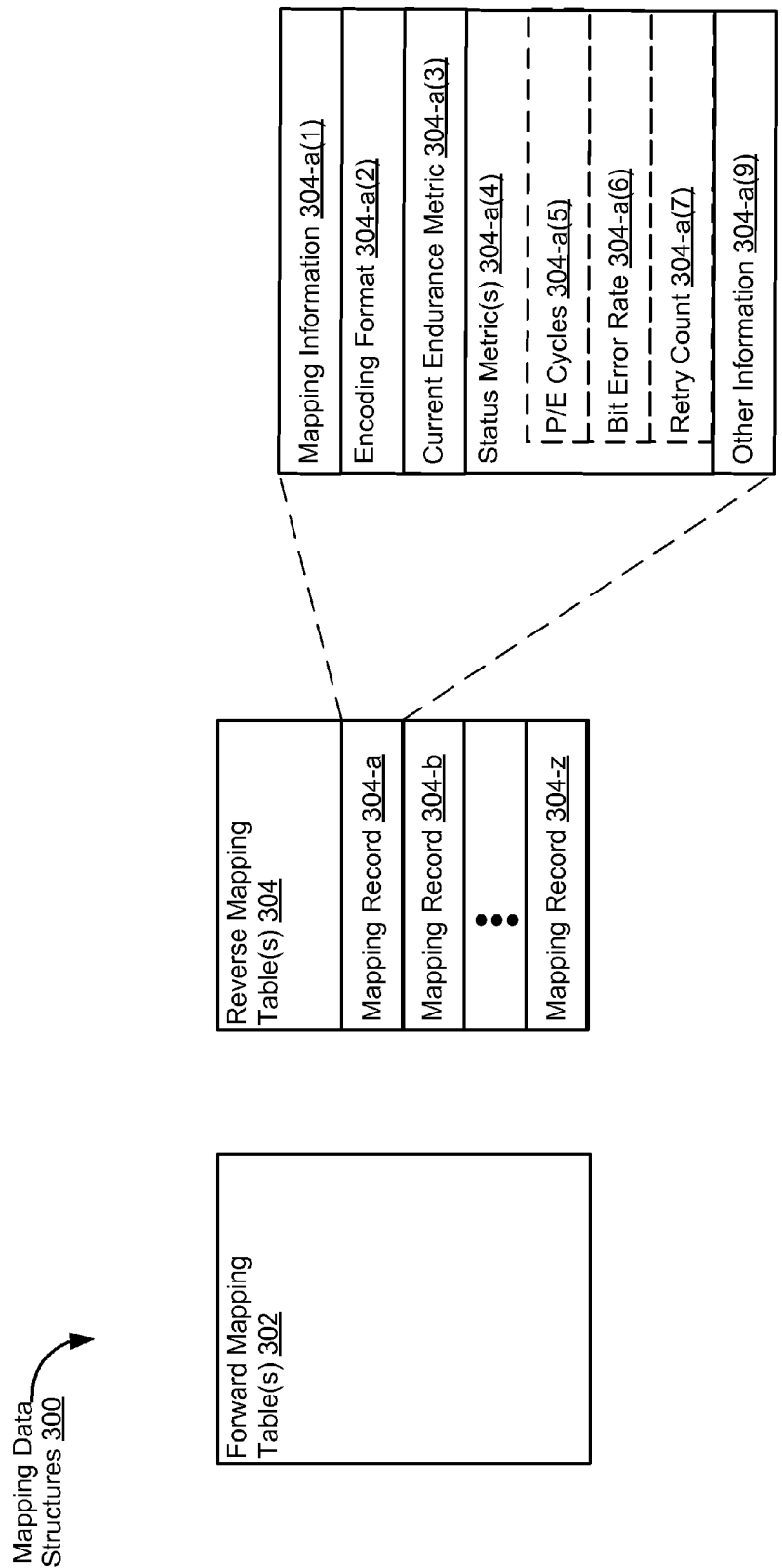
FIG. 3A is a block diagram illustrating mapping data structures and, more specifically, a forward mapping table and a reverse mapping table, in accordance with some embodiments.

FIG. 3A is a block diagram illustrating mapping data structures and, more specifically, a forward mapping table and a reverse mapping table, in accordance with some embodiments. In some embodiments, one or more forward mapping tables (e.g., forward mapping table(s) 302) are used for translating a logical address in a logical address space (e.g., an LBA) from the perspective of a host (e.g., computer system 110, FIG. 1) to a physical address in a physical address space (e.g., a "PPN") of non-volatile memory in a storage device (e.g., storage device 120, FIG. 1). In some embodiments, one or more reverse mapping tables (e.g., reverse mapping table(s) 304) are used for translating a PPN of non-volatile memory in the storage device to a logical address in a logical address space (e.g., an LBA) from the perspective of the host. In some embodiments, in addition to storing this mapping information, the reverse mapping tables are also used for storing information (sometimes called metadata) about NVM portions (e.g., blocks or superblocks) of the storage device, examples of which are an encoding format, a current endurance metric, and status metric(s) for each NVM portion.

For example, as illustrated in FIG. 3A, a reverse mapping table contains mapping records 304-a through 304-z. In some embodiments, each mapping record in the reverse mapping table stores the following information and data structures, or a subset or superset thereof:

mapping information (e.g., mapping information 304-a(1)) that identifies one or more logical addresses in a logical address space (e.g., an LBA) that is mapped to one or more physical addresses associated with the mapping record;

encoding format (e.g., encoding format 304-a(2)) information about a currently-configured encoding format (e.g., SLC, MLC, or TLC) for one or more non-volatile memory portions corresponding to the one or more physical addresses associated with the mapping record;

a current endurance metric (e.g., current endurance metric 304-a(3)) that reflects estimated endurance (e.g., estimated number of P/E cycles remaining, or estimated number of write operations remaining) at the currently-configured encoding format for the one or more non-volatile memory portions corresponding to the one or more physical addresses associated with the mapping record;

status metrics (e.g., status metrics 304-a(4)) including one or more of program/erase ("P/E") cycles (e.g., P/E cycles 304-a(5)) indicating a current count of the number of P/E cycles performed on the one or more non-volatile memory portions, bit error rate (e.g., bit error rate 304-a(6)) indicating or corresponding to a number of errors included in a codeword read from a page of the one or more non-volatile memory portions or an average number of errors included in the previous N codewords read from page(s) of the one or more non-volatile memory portions, and read retry count (e.g., retry count 304-a(7) indicating a highest number of read retries required to successfully read a codeword from the one or more non-volatile memory portions); in some embodiments, instead of (or in addition to) the read retry count, the status metrics include an erase retry count, indicating a highest number of retries required to successfully erase a block corresponding to the mapping record; and other information (e.g., other information 304-a(9)) about the one or more non-volatile memory portions corresponding to the one or more physical address associated with the mapping record (the other information, in some embodiments, includes other usage information indicating the health, performance, and/or endurance of the one or more non-volatile memory portions, such as total bytes written, ECC strength, and/or wear leveling data).

Although FIG. 3A shows reverse mapping table(s) 304 and, in particular, each mapping record contained therein (e.g., mapping record 304-a) in accordance with some embodiments, FIG. 3A is intended more as an example of how to store the various information and data structures which may be present in reverse mapping table(s) 304. In practice, and as recognized by those of ordinary skill in the art, the information and data structures shown separately could be combined and some information and data structures could be separated. For example, status metrics 304-a(4), in some embodiments, are implemented using a single status metric while, in other embodiments, status metrics 304-a(4) represent a combined status metric that takes into account a number of subsidiary status metrics (such as a combined status metric based on a combination of bit error rate, retry count, and estimated P/E cycles remaining).

Figure 3B:
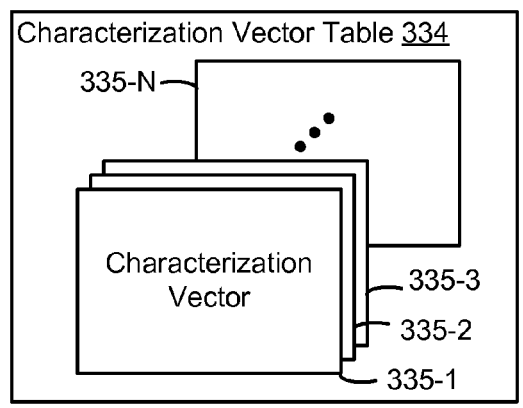
FIGS. 3B-3C are block diagrams illustrating data structures for storing characterization information, in accordance with some embodiments.
Figure 3C:
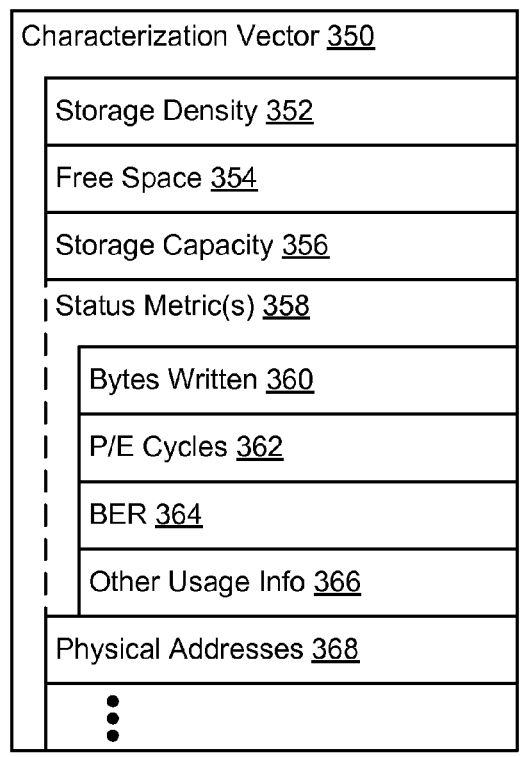

FIGS. 3B-3C are block diagrams illustrating alternative data structures for storing status metrics (i.e., alternatives to storing status metrics in reverse mapping table(s), as shown in FIG. 3A) and other characterization information about one or more NVM portions of a storage device. In some embodiments, the information contained within each mapping record other than the mapping information (e.g., encoding format, current endurance metric, status metric(s), and other information) is referred to as characterization data. In some embodiments, the characterization data is stored in a characterization vector table, which is a data structure that includes a collection of characterization vectors, instead of the reverse mapping table(s).

FIG. 3B is a block diagram illustrating an implementation of a characterization vector table 334, in accordance with some embodiments. Characterization vector table 334 includes a collection of characterization vectors 335, optionally implemented as a collection of tuples for efficient storage, that each store characterization data associated with a respective portion of storage device 120 (e.g., a distinct memory device, die, block, word line, word line zone, or page portion). In some embodiments, each vector (e.g., vector 335-1, vector 335-2, . . . , vector 335-N) in the collection of characterization vectors 335 stores characterization data (e.g., as shown in FIG. 3C, bytes written 360, P/E cycles 362, bit error rate (BER) 364, and/or other usage information 366) for a respective portion of storage device 120. In some implementations, the characterization data stored in characterization vectors 335 is statistically derived.

For example, without limitation, in some embodiments in which storage device 120 (FIG. 1) includes multiple memory devices, characterization vector table 334 includes at least one characterization vector for each distinct memory device of storage device 120. In another example, without limitation, in some embodiments in which storage device 120 (FIG. 1) includes multiple blocks, characterization vector table 334 includes at least one characterization vector for each distinct block of storage device 120. In another example, in some embodiments, characterization vector table 334 includes a set of distinct characterization vectors 335 for each block of storage device 120, and the set of distinct characterization vectors 335 for each die includes at least one distinct characterization vector for each word line or page in the block. More detailed example implementations of characterization vectors 335 are described below with reference to FIG. 3C.

FIG. 3C is a schematic diagram of an implementation of a representative characterization vector 350 (e.g., corresponding to any one of characterization vectors 335 shown in FIG. 3B) in accordance with some embodiments. In some embodiments, for a respective portion of storage device 120, characterization data stored in characterization vector 350 includes one or more of the following fields: (i) a storage density field 352 indicating the current storage density of memory cells in the respective portion of storage device 120 such as X3 (i.e., 3 bits per memory cell), X2 (i.e., 2 bits per memory cell), X1 (i.e., SLC or 1 bit per memory cell), or X0 (i.e., retired memory cells); (ii) a free space field 354 indicating the amount of free space available in the respective portion of storage device 120; and (iii) a storage capacity field 356 indicating the advertised (or declared storage) capacity to the host (e.g., computer system 110, FIG. 1) or the total capacity of the respective portion of storage device 120 (or a portion thereof). For example, in some implementations, the characterization vectors 335 for blocks or superblocks of the storage device 120 include the storage density field 352, but not a storage capacity field 356 and a free space field 354. Continuing with this example, a characterization vector for the entire storage device 120, or for each die or group of die in the storage device, includes a storage capacity field 356 and a free space field 354.

In some embodiments, characterization data stored in characterization vector 350 for a respective portion of storage device 120 also includes one or more status metrics 358, non-limiting examples of which include: (a) a bytes written field 360 indicating a number of bytes of data written to the respective portion of storage device 120; (b) a P/E cycle field 362 indicating a current count of the number of program-erase cycles performed on the respective portion of storage device 120; (c) a bit error rate (BER) field 364 indicating a number of errors detected in a codeword read from a page of the respective portion of storage device 120 or an average number of errors detected in the previous N codewords read from page(s) of the respective portion of storage device 120, where N is an integer greater than 1; and (d) other usage information 366 indicating the health, performance, and/or endurance of the respective portion of storage device 120.

In some embodiments, an exemplary status metric is a consistently-measured BER value at a consistently-referenced encoding format (e.g., lower page of SLC) for each NVM portion of the storage device. In some embodiments, the storage device periodically updates status metrics by erasing a memory portion, writing test data to the lower page of the memory portion in SLC mode, reading back the test data to determine a current BER, and storing the determined BER as the status metric. Additional details regarding this exemplary status metric are provided below, in reference to FIG. 7C.

In some embodiments, characterization data stored in characterization vector 350 optionally includes a combined status metric for the respective portion of storage device 120. In some embodiments, the combined status metric is associated with the output of a predefined algorithm (e.g., computed by metric maintaining module 224, FIG. 2) that takes into account one or more usage parameters associated with the respective portion of storage device 120. For example, the predefined algorithm incorporates one or more of: (a) a number of bytes written to the respective portion of storage device 120; (b) a number of P/E cycles performed on the respective portion of storage device 120; (c) a BER for codewords read from the respective portion of storage device 120; and (d) other usage information associated with the respective portion of storage device 120 (e.g., temperature, operating conditions, etc.).

FIG. 4 is a block diagram illustrating a data structure (e.g., an endurance estimation table 226) for storing endurance estimates for different encoding formats based on various status metrics (or various values of a single status metric) associated with a particular NVM portion of a storage device, in accordance with some embodiments. In some embodiments, a particular endurance estimation table 226 is used to store endurance estimates for different encoding formats (e.g., SLC, MLC, and TLC) based on various values of a first status metric (e.g., a consistently-measured bit error rate of the lower page of a flash memory cell) and one or more other endurance estimation tables 226 are used to store endurance estimates for different encoding formats (e.g., SLC, MLC, and TLC) based on various values for one or more other status metrics that are distinct from the first status metric (e.g., retry rate, P/E cycles, number of total bytes written, or a combined status metric). Therefore, a particular memory device of a storage device (e.g., storage medium 132, FIG. 1, or a portion thereof, such as a first die of the storage medium 132), in some embodiments, is associated with one or more endurance estimation tables depending on the number and type of status metrics used to monitor the health of NVM portions within the particular memory device. As one example, if the particular memory device uses BER as the status metric to monitor health of a first die and uses P/E cycles to monitor health of a second die, then the particular memory device would be associated with two endurance estimation tables (a first endurance estimation table that provides endurance estimates for various BER values and a second endurance estimation table that provides endurance estimates for various values of P/E cycles remaining).

In some embodiments, each endurance estimation table associated with a storage device is pre-populated (i.e., prior to the storage device being shipped) with default endurance estimation values. In some embodiments, the default endurance estimation values are determined by a manufacturer of the storage device based on characterization of similar storage devices having various values for various status metrics at each of the encoding formats included in each endurance estimation table. In some embodiments, the default endurance estimation values are updated during a firmware update process at the storage device based on updated characterization data (including characterization data that, in some embodiments, is reported by the storage device back to the manufacturer during the life of the storage device) for the similar storage devices.

In some embodiments, at least some of the values for the status metric that are included in each endurance estimation table (e.g., Metric-1, Metric-2, etc.) are predetermined such that the values reflect certain endurance thresholds that are satisfied as a storage device ages. For example, successive values of the status metric values in the endurance estimation table are selected to correspond to estimated successive decreases in the number of remaining P/E cycles for a representative encoding format (e.g., the status metric values selected correspond to an estimated decrease of 30 P/E cycles for TLC mode). In some embodiments, a change in status metric value from one value to the next in the set of the status metric values in the table corresponds to an estimated decrease of 50, 75, or 100 P/E cycles for TLC mode. In other embodiments, the values selected correspond to a representative set of all possible values for the status metric.

An exemplary endurance estimation table is illustrated in FIG. 4. As shown, the endurance estimation table contains records 402-1 through 402-last and optionally contains a header 402-0. Header 402-0, in some embodiments, contains a brief description of each field of information (e.g., each field associated with each of the records) stored within the endurance estimation table. In this non-limiting example, header 402-0 contains fields for "Status Metric" (e.g., a description of the status metric used in the endurance estimation table), "Endurance Estimate for TLC" (e.g., a value or a plurality of values describing an endurance estimate for an NVM portion configured to operate in TLC mode), "Endurance Estimate for MLC" (e.g., a value or a plurality of values describing an endurance estimate for an NVM portion configured to operate in MLC mode), and "Endurance Estimate for SLC" (e.g., a value or a plurality of values describing an endurance estimate for an NVM portion configured to operate in SLC mode).

In some embodiments, one or more of record 402-1 through 402-last contains one or more additional fields, such as a "reconfiguration criteria" field that identifies criteria that must be satisfied prior to reconfiguring a particular NVM portion (e.g., a threshold number of estimated P/E cycles that will be available after reconfiguring the particular NVM portion).

As pictured in FIG. 4, records 402-1 through 402-last contain information corresponding to endurance estimates for a NVM portion based on the NVM portion having various values for a particular status metric. Stated another way, an endurance estimated for a particular NVM portion can be retrieved from the endurance estimation table by performing a lookup with a current value of the status metric for the NVM portion and the NVM portion's current encoding format. Record 402-1 indicates that when the NVM portion has a value of Metric-1 for the status metric, then: (i) the estimated endurance for the NVM portion configured to operate in TLC mode is 100% and 300 P/E cycles, (ii) the estimated endurance for the NVM portion configured to operate in MLC mode is 100% and 5000 P/E cycles, and (iii) the estimated endurance for the NVM portion configured to operate in SLC mode is 100% and 20000 P/E cycles. Record 402-2 indicates that when the NVM portion has a value of Metric-2 for the status metric, then: (i) the estimated endurance for the NVM portion configured to operate in TLC mode is 83% and 250 P/E cycles, (ii) the estimated endurance for the NVM portion configured to operate in MLC mode is 90% and 4500 P/E cycles, and (iii) the estimated endurance for the NVM portion configured to operate in SLC mode is 99% and 19800 P/E cycles. Record 402-n indicates that when the NVM portion has a value of Metric-n for the status metric, then: (i) the estimated endurance for the NVM portion configured to operate in TLC mode is 0% and 0 P/E cycles, (ii) the estimated endurance for the NVM portion configured to operate in MLC mode is 40% and 2000 P/E cycles, and (iii) the estimated endurance for the NVM portion configured to operate in SLC mode is 75% and 15000 P/E cycles. Record 402-last indicates that when the NVM portion has a value of Metric-last for the status metric (e.g., metric-last is a value for the status metric that is determined to reflect end-of-life status for the NVM portion), then: (i) the estimated endurance for the NVM portion configured to operate in TLC mode is 0% and 0 P/E cycles, (ii) the estimated endurance for the NVM portion configured to operate in MLC mode is 0% and 0 P/E cycles, and (iii) the estimated endurance for the NVM portion configured to operate in SLC mode is 0% and 0 P/E cycles.

In some embodiments, in order to prolong the life of a storage device through a process of reconfiguring individual NVM portions of the storage device, one or more endurance estimation tables 226 are used to estimate current and projected mean endurance values for a plurality of NVM portions of a storage device. For example, FIG. 5A is a simplified, prophetic diagram representing estimated endurance of active blocks (e.g., blocks that are actively used to fulfill read, write, unmap, and erase requests received from a host) in a plurality of NVM portions of a storage device before processing storage density reconfigurations, including data points representing current mean and projected mean endurance of a storage device as a whole, in accordance with some embodiments.

Figure 5A:
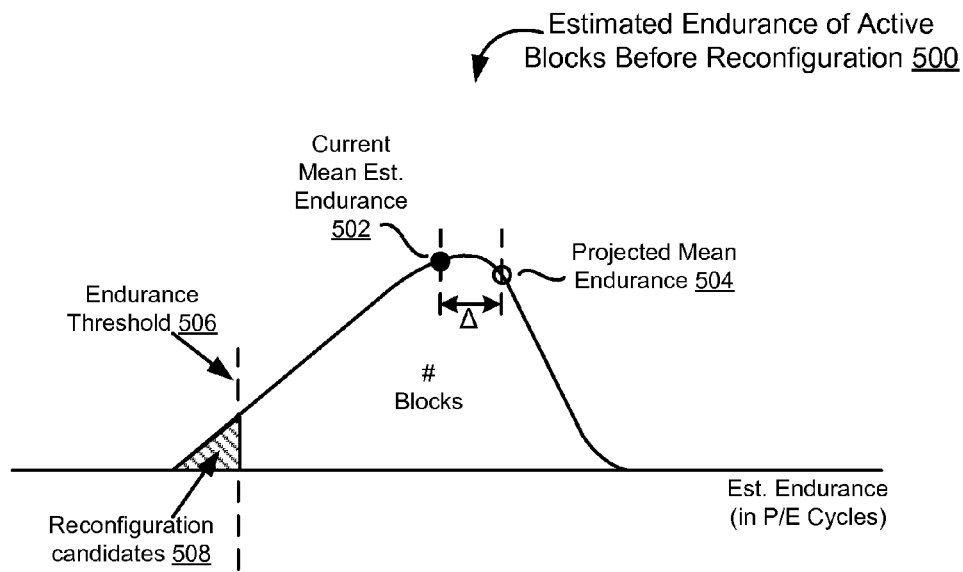
FIG. 5A is a simplified, prophetic diagram representing estimated endurance of active blocks in a storage device before a storage density reconfiguration of one or more memory portions of the storage device, including data points representing current mean and projected mean endurance of the storage device as a whole, in accordance with some embodiments.

As shown in FIG. 5A, by reconfiguring individual NVM portions of a storage device (e.g., reconfiguration candidates 508), the projected mean endurance for the storage device as a whole is expected, in this example, to increase, thus lengthening the useful life of the storage device. The x-axis of the diagram shown in FIG. 5A represents estimated endurance (in P/E cycles) for individual NVM portions. In some embodiments, the scale of the x-axis extends from 0 (end-of-life for the NVM portion, so no P/E cycles remain) to 20000 (beginning of life for the NVM portion configured to operate in SLC mode). The curve shown in diagram 500 represents a distribution of estimated P/E cycles remaining across all NVM portions of the storage device (or a portion thereof). In some embodiments, the curve 500 represents a distribution of estimated P/E cycles remaining across a single NVM die of the storage device.

In some embodiments, an endurance threshold (e.g., endurance threshold 506) is established (e.g., predefined or established on an ad hoc basis in response to changes to the overall estimated endurance of the storage device over time) that indicates when a NVM portion is a candidate for reconfiguration to a different encoding format. In the example shown in FIG. 5A, before reconfiguring the NVM portions that are candidates for reconfiguration, a current mean estimated endurance for the storage device is a first value (e.g., current mean est. endurance 502) and a mean projected endurance is a second value that is greater than the first value (mean projected endurance 504). In some embodiments, the storage device (or a component thereof, such as metric maintaining module 224, trigger condition detection module 228, and/or reconfiguration module 230) determines the mean projected endurance by retrieving an endurance estimate at a new encoding format for each reconfiguration candidate from one of the one or more endurance estimation tables (e.g., endurance estimation table 226, FIG. 4) and averaging the retrieved endurance estimates with current endurance estimates of the remaining NVM portions (e.g., those that are not reconfiguration candidates), in order to determine the mean projected endurance of the storage device after reconfiguration of the reconfiguration candidates.

Figure 5B:
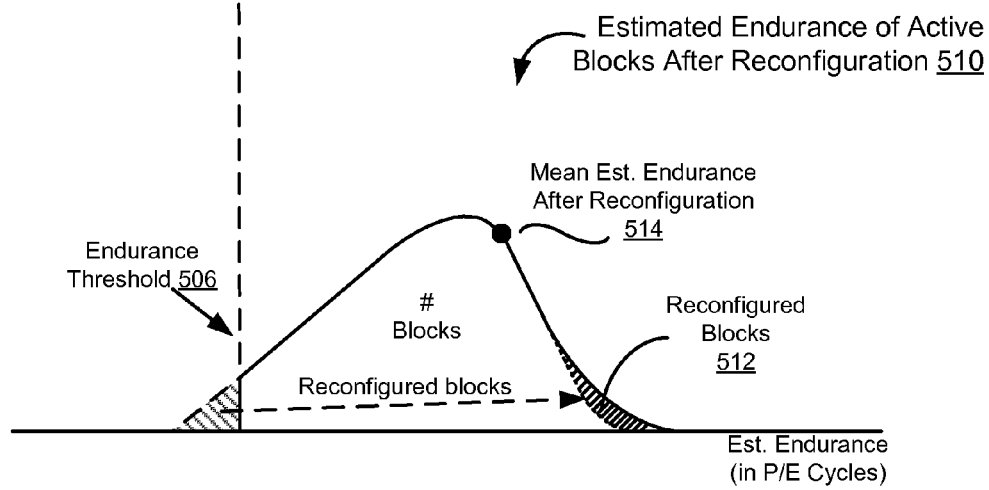
FIG. 5B is a simplified, prophetic diagram representing estimated endurance of active blocks in a storage device after a storage density reconfiguration of one or more memory portions of the storage device, including a data point representing estimated mean endurance of the storage device as a whole, in accordance with some embodiments.

Turning now to FIG. 5B, a simplified, prophetic diagram representing estimated endurance of active blocks (e.g., blocks that are actively used to fulfill write, unmap, and erase requests received from a host) in a storage device after processing storage density reconfigurations, including a data point representing estimated mean endurance of the storage device as a whole, in accordance with some embodiments, is shown.

As illustrated in FIG. 5B, after reconfiguring the reconfiguration candidates, the current endurance estimates for each reconfiguration candidate are updated (e.g., by determining a new value for the status metric after reconfiguration to the new encoding format and storing the new value in an appropriate record of a data structure, see FIGS. 3A-3C). As shown, current endurance estimates for the reconfiguration candidates (e.g., reconfigured blocks) increase after reconfiguration and, thus, all or substantially all of the reconfiguration candidates move to higher estimated endurance values, as shown in diagram 510 (e.g., reconfigured blocks 512). Also, the mean estimated endurance after reconfiguration (e.g., mean est. endurance after reconfiguration 514) is substantially the same value as the mean projected endurance 504 of graph 500 (FIG. 5A). Stated another way, the storage device achieves an improved overall estimated endurance after processing storage density reconfigurations for the reconfiguration candidates, and the improved overall estimated endurance (e.g., mean est. endurance after reconfiguration) is substantially the same as the projected mean endurance that was determined before processing the reconfigurations. In this way, the storage device reliably predicts an improved overall estimated endurance that will be achieved by reconfiguring identified reconfiguration candidates.

Figure 6:
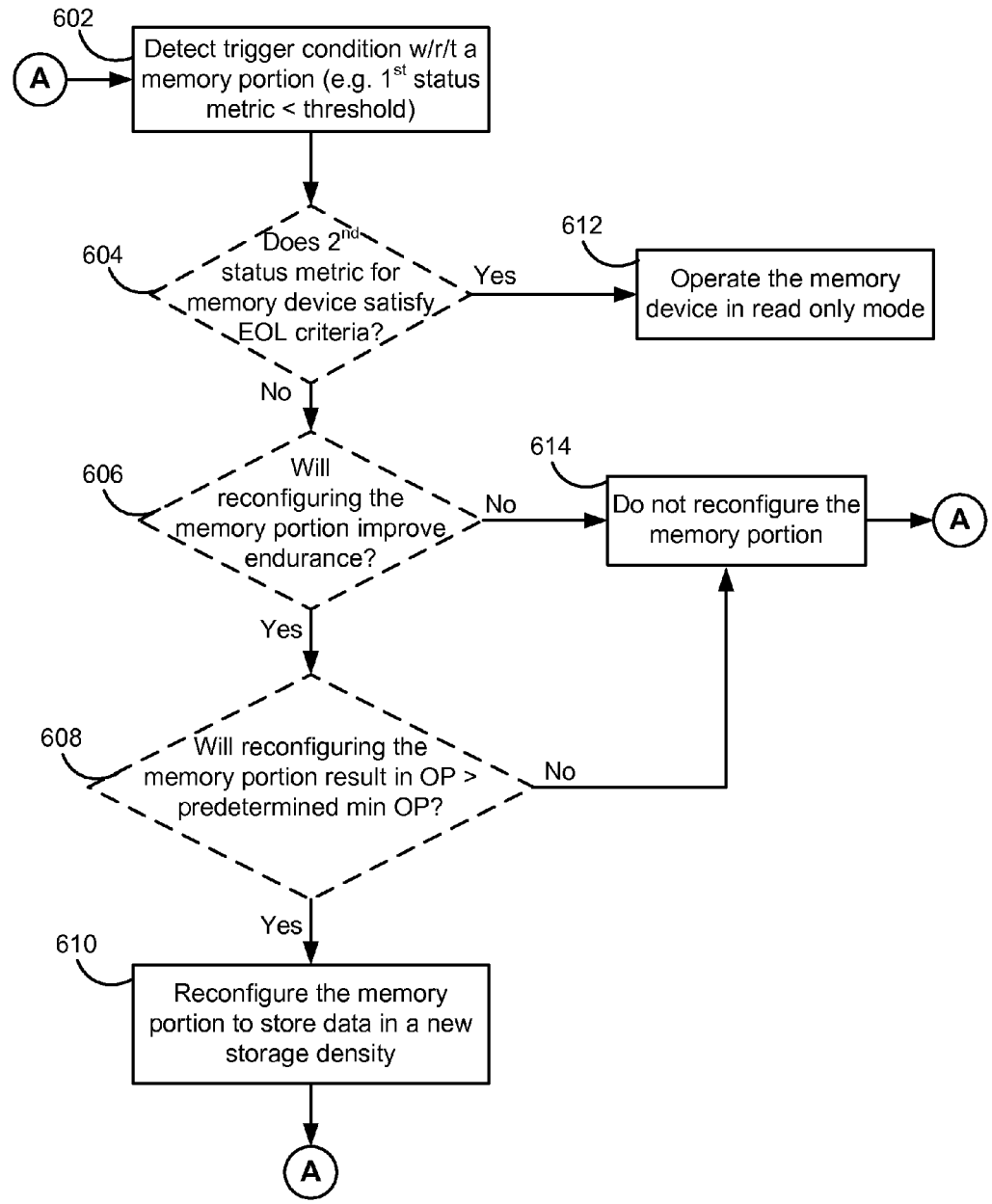
FIG. 6 illustrates a flowchart representation of a method of processing storage density reconfigurations in a storage device, in accordance with some embodiments.

FIG. 6 illustrates a flowchart representation of a method of processing storage density reconfigurations within a storage system, in accordance with some embodiments. With reference to the data storage system 100 pictured in FIG. 1, in some embodiments, a method 600 is performed by a storage device (e.g., storage device 120) or one or more components of the storage device (e.g., storage controller 124). In some embodiments, the method 600 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 600 are performed at a host system (e.g., computer system 110) that is operatively coupled with the storage device and other operations of method 600 are performed at the storage device. In some embodiments, method 600 is governed, at least in part, by instructions that are stored in a non-transitory computer-readable storage medium and that are executed by one or more processors of the host system (the one or more processors of the host system are not shown in FIG. 1). For ease of explanation, the following describes method 600 as performed by the storage device (e.g., by storage controller 124 of storage device 120, FIG. 1). With reference to FIG. 2, in some embodiments, the operations of method 600 are performed, at least in part, by a metric maintaining module (e.g., metric maintaining module 224, FIG. 2), a trigger condition detection module (e.g., trigger condition detection module 228, FIG. 2), a reconfiguration module (e.g., reconfiguration module 230, FIG. 2), and an over-provisioning module (e.g., over-provisioning module 222, FIG. 2) of management module 121-1.

In some embodiments, processing storage density reconfigurations method 600 begins when the storage device (e.g., storage device 120, FIG. 1, or a component thereof such as trigger condition detection module 228, FIG. 2) detects (602) a trigger condition with respect to ("w/r/t") a memory portion (e.g., a die, die plane, superblock, block, or page of the storage device). In some embodiments, the storage device includes a plurality of NVM portions (e.g., a plurality of die, die planes, superblocks, blocks, or pages) in one or more memory devices (e.g., one or more die in one or more storage mediums 132, FIG. 1). For explanatory purposes with reference to processing storage density reconfigurations method 600, the memory portion is described as a first block of a plurality of blocks in a first die (i.e., memory device) of the storage device.

In some embodiments, the trigger condition is detected when a first status metric for the first block satisfies a threshold. For example, trigger condition detection module 228 and/or metric maintaining module 224 determine that a BER for the first block is above a threshold BER value or an estimated number of remaining P/E cycles for the first block is below an endurance threshold (such as endurance threshold 506, FIGS. 5A-5B). The trigger condition, in some embodiments, is based on the current encoding format of the memory portion (e.g., the first block). The above discussion regarding FIGS. 3A-3C includes additional details concerning exemplary status metrics. The storage device then optionally conducts a first determination (604) as to whether a second status metric (distinct from the first status metric for the first block) for the first die (or the storage medium including the first die) satisfies end-of-life (EOL) criteria. In accordance with the first determination indicating that the second status metric satisfies (612—Yes) the EOL criteria, the storage device operates the first die (or the storage medium including the first die) in read-only mode.

In some embodiments, in accordance with the first determination instead indicating that the second status metric does not satisfy (612—No) the EOL criteria, the storage device proceeds to optionally conduct a second determination (606) as to whether reconfiguring the first block will improve endurance (or will satisfy predefined endurance improvement criteria) of a predefined portion of the storage device (e.g., the first die as a whole, a die plane portion of the first die that includes the first block, or a superblock portion of the first die that includes the first block, or the first block itself). In accordance with the second determination indicating that reconfiguring the first block will not improve endurance for the predefined portion of the first die (606—No), the storage device does not reconfigure (i.e., the storage device forgoes reconfiguring) the first block (614) and the method 600 returns to processing step 602 when a trigger condition is again detected. In some embodiments, improved endurance is defined in reference to predefined endurance improvement criteria (as described below in reference to processing step 734, FIG. 7C, and in reference to processing step 830, FIG. 8B).

In some embodiments, in accordance with the second determination instead indicating that reconfiguring the first block will improve endurance (or will satisfy predefined endurance improvement criteria) for the predefined portion of the first die (606—Yes), the storage device proceeds to optionally conduct a third determination (608) as to whether reconfiguring the first block will result in over-provisioning (e.g., a projected amount of over-provisioning for the storage device as a whole, including all memory devices or die) satisfying (e.g., greater than) a predetermined minimum amount of over-provisioning. In accordance with the third determination indicating that reconfiguring the first block will not result (608—No) in over-provisioning for the storage device satisfying the predetermined minimum amount of over-provisioning, the storage device does not reconfigure the first block (614) and the method 600 returns to processing step 602 when a trigger condition is again detected.

In some embodiments, conducting the third determination includes calculating a projected storage capacity of the storage device after reconfiguring the first block, and determining a projected size of an over-provisioning pool by subtracting from the projected storage capacity a declared capacity of the storage device. Reconfiguring the first block to store data at an encoding format having a lower storage density (e.g., reconfiguring the first block from TLC to SLC mode) reduces storage capacity of the storage device, and thus reduces over-provisioning (e.g., by reducing the size of the over-provisioning pool). Therefore, the third determination helps to protect the amount of over-provisioning for the storage device by ensuring that repurposing blocks from the over-provisioning pool will not result in dropping the amount of over-provisioning in the storage device to an unacceptable level (i.e., a level below the predetermined minimum amount of over-provisioning).

In some embodiments, in accordance with the third determination instead indicating that reconfiguring the first block will result (608—Yes) in over-provisioning for the storage device satisfying the predetermined minimum amount of over-provisioning, the storage device reconfigures (610) the first block from a currently-configured first encoding format having a first storage density (e.g., TLC) to a second encoding format having a second storage density (e.g., MLC).

In some embodiments, method 600 reduces over-provisioning levels and includes: (1) detecting a wear condition as to one or more NVM portions of the storage device, in which a total storage capacity of the non-volatile memory of the storage device includes declared capacity and over-provisioning, and (2) in response to detecting the wear condition, performing a remedial action that reduces over-provisioning of the non-volatile memory of the storage device without reducing declared capacity of the non-volatile memory of the storage device. In some embodiments, performing a remedial action that reduces over-provisioning includes marking one or more blocks of the non-volatile memory as unusable. In some embodiments, performing a remedial action that reduces over-provisioning includes reconfiguring (or converting) one or more MLC blocks to SLC, or more generally, changing the physical encoding format of one or more NVM portions of the storage device. In some embodiments, reducing over-provisioning is performed by an over-provisioning module of management module 121 (e.g., over-provisioning module 222, FIG. 2).

Although the first, second, and third determinations above have all been described as optional, in some embodiments, at least one or both of the second and third determinations are required. Thus, in some embodiments, processing storage density reconfigurations method 600 requires only conducting the second determination after detecting the trigger condition (602), while in other embodiments, processing storage density reconfigurations method 600 requires only conducting the third determination after detecting the trigger condition (e.g., method 800 of FIGS. 8A-8B, described in detail below). In yet other embodiments, after detecting the trigger condition, processing storage density reconfigurations method 600 requires conducting either the second determination or the third determination and optionally conducting the other determination (e.g., method 700, FIGS. 7A-7C, described in detail below). Moreover, the particular order in which the first, second, and third determinations are conducted can be varied in different embodiments. For example, in some embodiments, the second and third determinations are performed prior to the first determination. As an additional example, in some embodiments, the third determination is performed prior to the second determination and the first determination can be performed before, after, or in between the third and second determinations, respectively.

Additional details concerning each of the processing steps for processing storage density reconfigurations method 600, as well as details concerning additional processing steps for storage density reconfigurations, are presented below with reference to FIGS. 7A-7C and FIGS. 8A-8B.

Figure 7A:
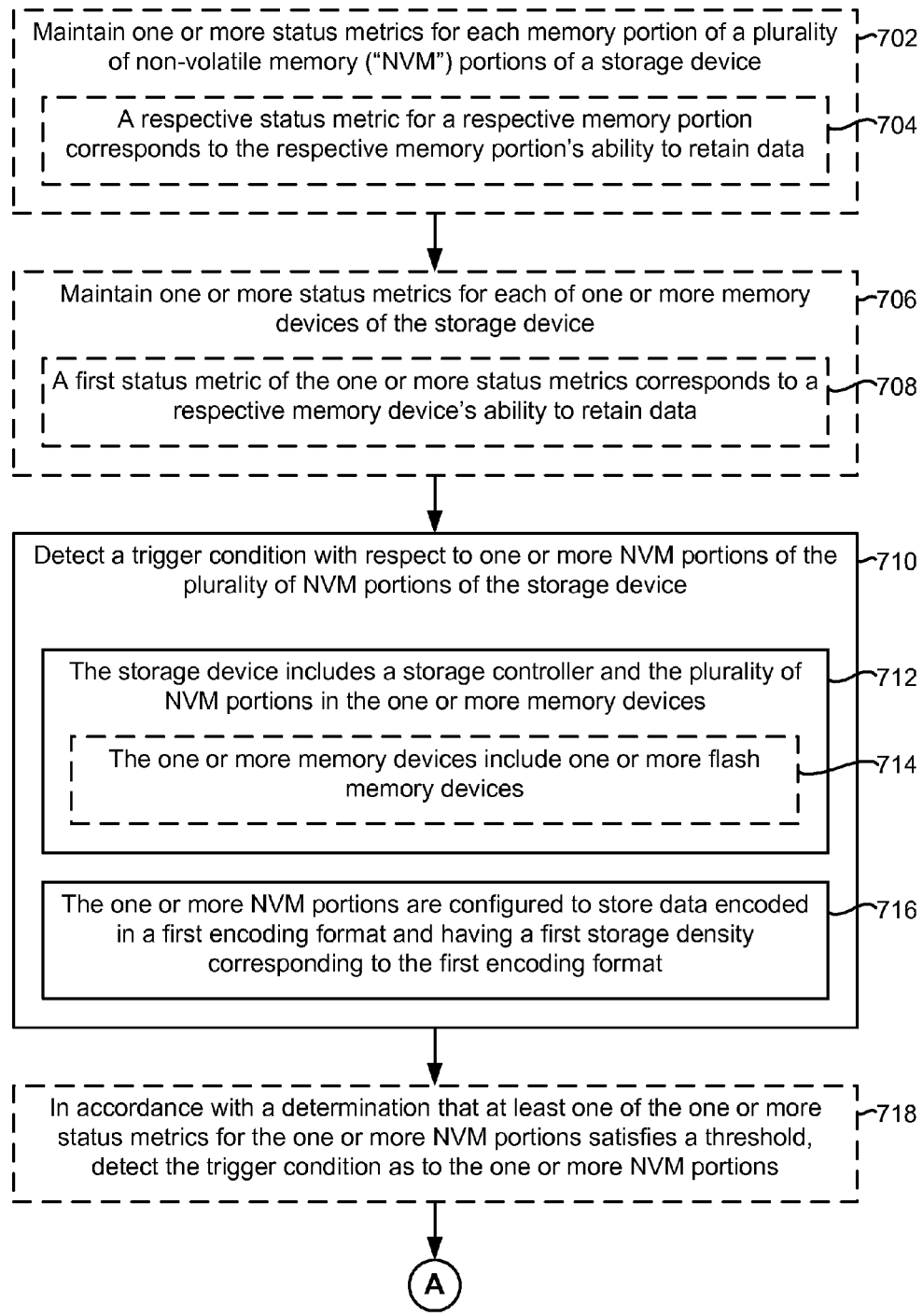
FIGS. 7A-7C illustrate flowchart representations of methods of processing storage density reconfigurations in a storage device, in accordance with some embodiments.
Figure 7B:
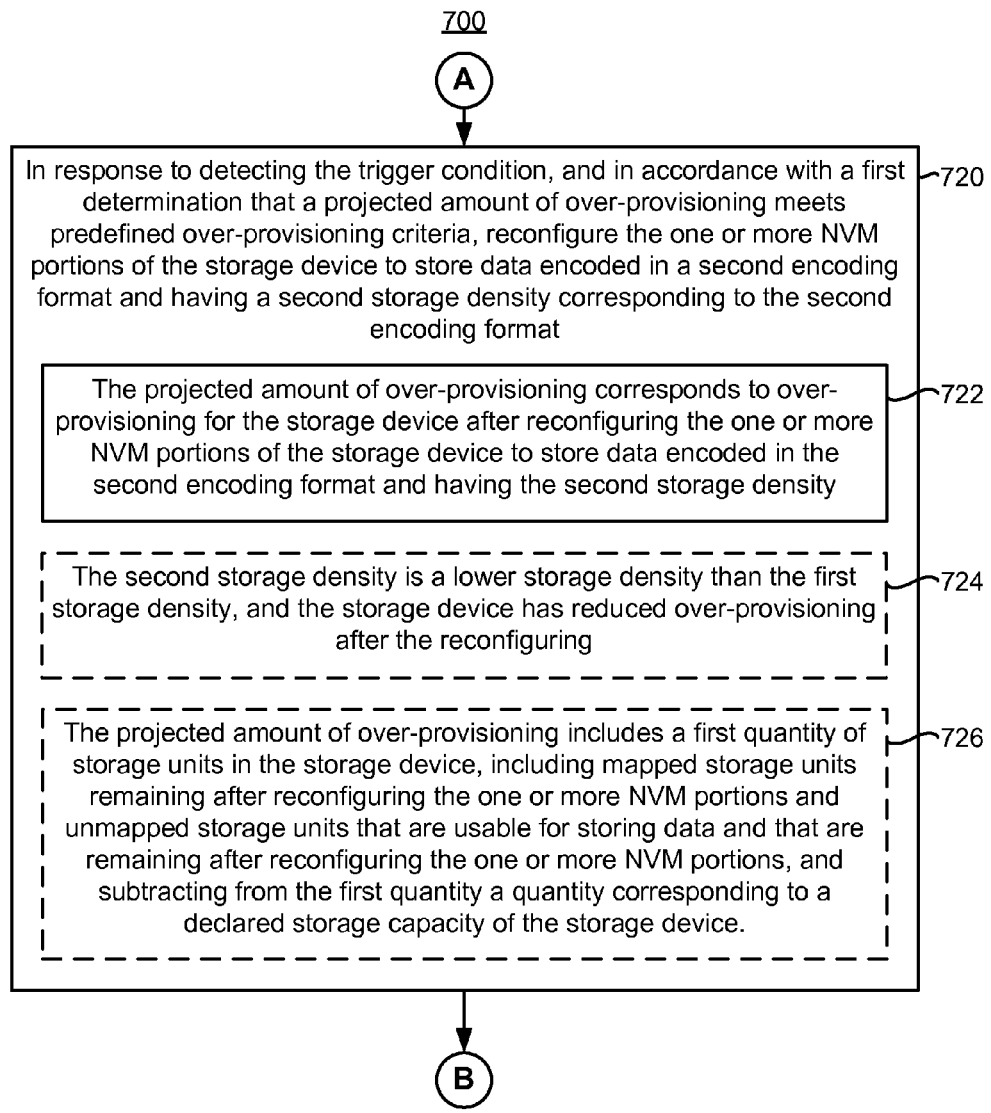
Figure 7C:
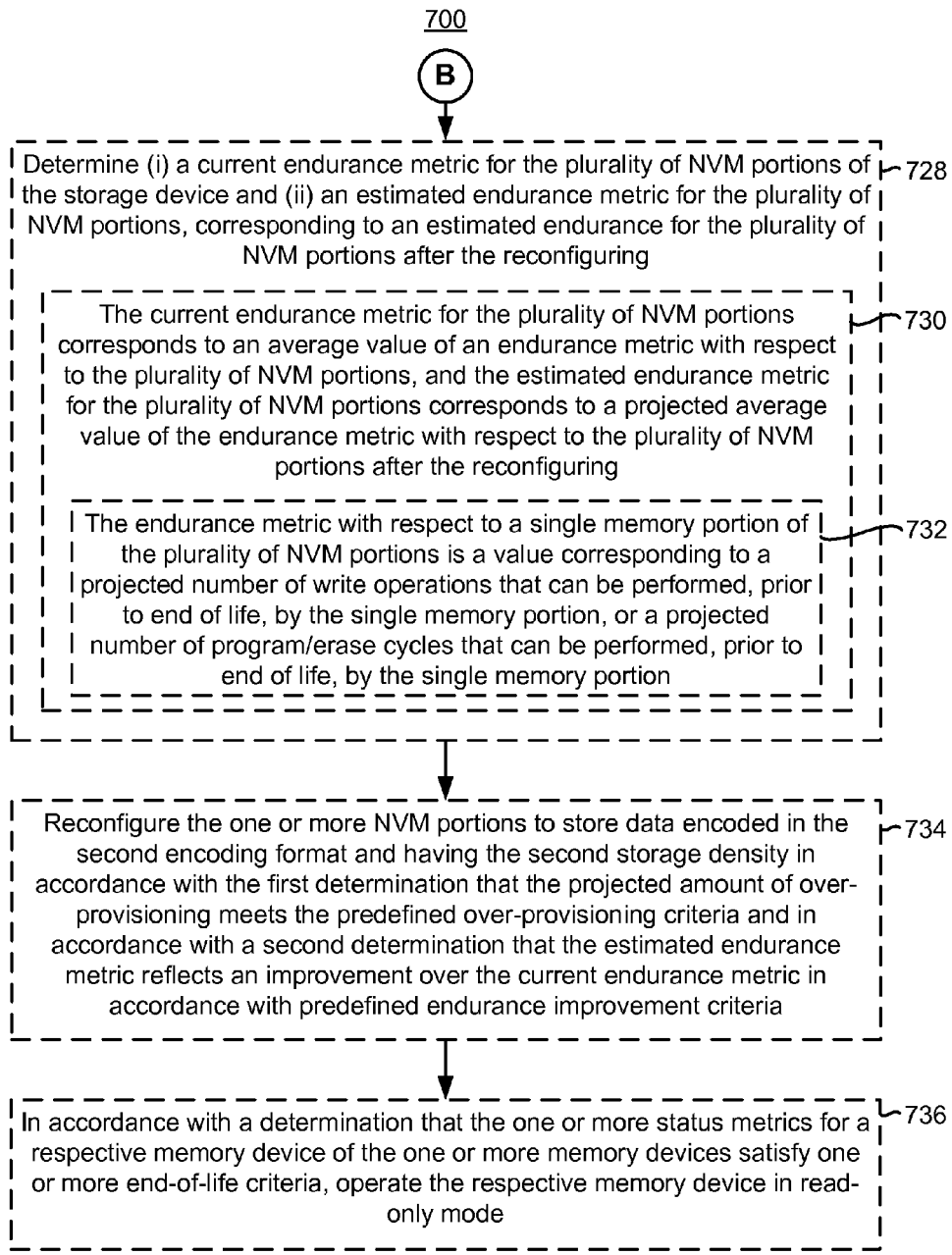

FIGS. 7A-7C illustrate flowchart representations of a method of processing storage density reconfigurations within a storage system, in accordance with some embodiments. With reference to the data storage system 100 pictured in FIG. 1, in some embodiments, a method 700 is performed by a storage device (e.g., storage device 120) or one or more components of the storage device (e.g., storage controller 124). In some embodiments, the method 700 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 700 are performed at a host system (e.g., computer system 110) that is operatively coupled with the storage device and other operations of method 700 are performed at the storage device. In some embodiments, method 700 is governed, at least in part, by instructions that are stored in a non-transitory computer-readable storage medium and that are executed by one or more processors of the host system (the one or more processors of the host system are not shown in FIG. 1). For ease of explanation, the following describes method 700 as performed by the storage device (e.g., by storage controller 124 of storage device 120, FIG. 1). With reference to FIG. 2, in some embodiments, the operations of method 700 are performed, at least in part, by a metric maintaining module (e.g., metric maintaining module 224, FIG. 2), a trigger condition detection module (e.g., trigger condition detection module 228, FIG. 2), a reconfiguration module (e.g., reconfiguration module 230, FIG. 2), and an over-provisioning module (e.g., over-provisioning module 222, FIG. 2) of management module 121-1.

A storage device (e.g., storage device 120, FIG. 1) optionally maintains (702) one or more status metrics for each memory portion of a plurality of NVM portions (e.g., each page, block, superblock, or die plane) of the storage device. In some embodiments, a respective status metric for a respective memory portion corresponds to the respective memory portion's ability to retain data (704). In some embodiments, the storage device optionally maintains one or more status metrics for each of one or more memory devices (e.g., one or more die on one or more storage mediums 132, FIG. 1) of the storage device (706). Accordingly, in some embodiments, a first status metric of the one or more status metrics corresponds to a respective memory device's ability to retain data (708). Exemplary status metrics for memory portions and memory devices are discussed in more detail above (see, e.g., descriptions of FIGS. 3A-3C, above).

The storage device (or a component thereof, such as trigger condition detection module 228, FIG. 2) detects (710) a trigger condition with respect to one or more NVM portions of the plurality of NVM portions (e.g., one or more die plane, blocks, superblocks, pages, or other predefined NVM portion) of the storage device. The storage device includes (712) a storage controller (e.g., storage controller 124, FIG. 1) and the plurality of NVM portions in the one or more memory devices (e.g., one or more die on one or more storage mediums 132, FIG. 1). In some embodiments, the one or more memory devices include (714) one or more flash memory devices (e.g., one or more flash memory die).

In accordance with a determination that at least one of the one or more status metrics (e.g., one or more of the status metrics 304-a(4) through 304-a(7), FIG. 3A) for the one or more NVM portions satisfies a threshold (718), the storage device detects the trigger condition as to the one or more NVM portions. In some embodiments, the one or more status metrics are retrieved from a mapping record associated with the one or more NVM portions in a mapping data structure (e.g., one or more mapping records for the one or more NVM portions in reverse mapping table(s) 304, FIG. 3A). The trigger condition can be with respect to a single memory portion or it can be a collective trigger condition with respect to multiple memory portions that are not necessarily contiguous (e.g., one or more blocks that are on two distinct die). For example, the trigger condition can be detected when at least N TLC-encoded blocks (e.g., 10 blocks) have P/E counts in excess of C (e.g., a value equal to 95% of the projected maximum P/E for a typical TLC-encoded block). In another example, the trigger condition is detected when an estimated number of remaining bytes written or estimated number of P/E cycles remaining for the one or more memory portions is below a predetermined number. In one additional example, the trigger condition is detected when the BER of the one or more NVM portions is above a predetermined BER threshold. In yet one more example, the trigger condition is detected when a combined status metric for the one or more NVM portions no longer meets (e.g., is below) a predetermined threshold. In some embodiments, the status metric is produced by an algorithm that accounts for a plurality of status metrics associated with the one or more NVM portions (as discussed above, for example, in reference to FIGS. 3A-3C). The one or more NVM portions are configured (716) (i.e., prior to reconfiguration) to store data encoded in a first encoding format and having a first storage density (e.g., TLC encoding format with a storage density of 3 bits per cell) corresponding to the first encoding format.

Turning now to FIG. 7B, in response to detecting the trigger condition, and in accordance with a first determination that a projected amount of over-provisioning meets predefined over-provisioning criteria (e.g., the projected over-provisioning is greater than a minimum acceptable amount of over-provisioning for the storage device), the storage device (or a component thereof, such as reconfiguration module 230, FIG. 2) reconfigures (720) the one or more NVM portions of the storage device to store data in a second encoding format and having a second storage density corresponding to the second encoding format. For example, the reconfiguration module 230 reconfigures one or more blocks from storing data using TLC mode to storing data using MLC mode or SLC mode. The projected amount of over-provisioning corresponds (722) to over-provisioning for the storage device after (e.g., that would result from) reconfiguring the one or more NVM portions of the storage device to store data encoded in the second encoding format and having the second storage density. In some embodiments, the projected amount of over-provisioning meets the predefined over-provisioning criteria only when the projected amount of over-provisioning is greater than a predetermined minimum amount of over-provisioning for the storage device.

In some embodiments, the projected amount of over-provisioning is determined by an over-provisioning module (e.g., over-provisioning module 222, FIG. 2). Determining the projected amount of over-provisioning allows the storage device to proactively monitor and manage over-provisioning levels before reconfiguring the one or more NVM portions (as explained above in reference to processing step 608, FIG. 6). Thus, the storage device uses the predefined over-provisioning criteria to ensure that over-provisioning levels remain acceptable. In some embodiments, the predefined over-provisioning criteria include a range of acceptable levels for over-provisioning levels in the storage device that account for age of the storage device (e.g., in some embodiments, less over-provisioning is acceptable as the storage device ages).

Typically, the second storage density is a lower storage density than the first storage density (724), and the storage device has reduced over-provisioning after the reconfiguring. In some embodiments, the storage controller monitors the storage capacity of each of the one or more memory devices of the storage device as a whole by reconfiguring memory portions as they wear over time, which reduces the size of the storage device's over-provisioning pool, while avoiding reductions in declared storage capacity. In some embodiments, the storage device maintains a predetermined minimum amount of over-provisioning and if reconfiguring the one or more memory portions would result in reducing the amount of over-provisioning below the predetermined minimum amount, then the storage device forgoes reconfiguring the one or more memory portions. In this way, the storage device ensures that the predetermined minimum amount of over-provisioning is maintained.

In some embodiments, the projected amount of over-provisioning includes (726) a first quantity of storage units in the storage device, including mapped storage units remaining after reconfiguring the one or more NVM portions and unmapped storage units that are usable for storing data and that are remaining after reconfiguring the one or more NVM portions, and subtracting from the first quantity a quantity corresponding to a declared storage capacity of the storage device. In some embodiments, the storage units are SLC-configured erase blocks and MLC-configured erase blocks, or pages, or other memory portions, and the quantity of storage units is, for example, two storage units for each MLC-configured erase block and one storage unit for each SLC-configured erase block.

Turning now to FIG. 7C, in some embodiments, the storage device (or a component thereof, such as metric maintaining module 224, FIG. 2) determines (i) a current endurance metric for the plurality of NVM portions of the storage device and (ii) an estimated endurance metric for the plurality of NVM portions, corresponding to an estimated (or projected) endurance for the plurality of NVM portions after the reconfiguring (728). As a non-limiting example of determining the current endurance metric for the plurality of NVM portions, the metric maintaining module 224 retrieves current endurance metrics for each NVM portion of the plurality of NVM portions and then determines an overall current endurance metric for the plurality of NVM portions based on the individual values (e.g., a sum, an average, or a weighted average based on usage histories for each NVM portion).

As a non-limiting example of determining the estimated endurance metric, the metric maintaining module 224 retrieves a status metric for each of the one or more NVM portions (e.g., from one or more mapping records (e.g., mapping record 304-*a*, FIG. 3A, or characterization vectors 350, FIG. 3C) and queries an endurance estimation table (e.g., endurance estimation table 226) to retrieve the estimated endurance at the new encoding format (e.g., second encoding format for the one or more NVM portions) that corresponds to the retrieved status metric. For example, if a particular NVM portion (e.g., a first block) of the one or more NVM portions has a retrieved status metric of Metric-2 and the new encoding format is SLC, then the estimated endurance for the first block is 19800 P/E cycles (98% endurance). Estimated endurance is retrieved for each memory portion of the one or more memory portions and the retrieved estimated endurance values are then used to determine estimated endurance for the plurality of NVM portions. In some embodiments, the retrieved estimated endurance values (or an average thereof) is/are added to current endurance values (or an average thereof) for NVM portions in the plurality of NVM portions that are not being reconfigured and then this overall sum is divided by the number of NVM portions in the plurality of NVM portions. In some embodiments, the estimated endurance for the plurality of NVM portions is given by the formula: ((average endurance of memory portions in TLC encoding format*# blocks in TLC encoding format)+(average endurance of blocks in lower encoding levels*# of blocks in lower encoding levels))/total # blocks.

In some embodiments, the current endurance metric for the plurality of NVM portions corresponds (730) to an average value of an endurance metric with respect to the plurality of NVM portions, and the estimated endurance metric for the plurality of NVM portions corresponds to a projected average value of the endurance metric with respect to the plurality of NVM portions after (i.e., that would result from) the reconfiguring. In some embodiments, the endurance metric with respect to a single memory portion of the plurality of NVM portions is a value corresponding (732) to a projected number of write operations that can be performed, prior to end of life, by the single memory portion, or a projected number of program/erase cycles that can be performed, prior to end of life, by the single memory portion.

In some embodiments, the storage device (or a component thereof, such as reconfiguration module 230, FIG. 2) reconfigures (734) the one or more NVM portions to store data encoded in the second encoding format and having the second storage density in accordance with the first determination that the projected amount of over-provisioning meets the predefined over-provisioning criteria and in accordance with a second determination that the estimated endurance metric reflects an improvement over the current endurance metric in accordance with predefined endurance improvement criteria (e.g., the estimated endurance is greater than the current endurance metric). In this way, the storage device considers both over-provisioning levels in the storage device and improvements to endurance, prior to reconfiguring memory portions. In some embodiments, the estimated endurance metric comprises an improvement over the current endurance metric in accordance with predefined endurance improvement criteria when the estimated endurance metric is larger than the current endurance metric. In some other embodiments, the estimated endurance metric comprises an improvement over the current endurance metric in accordance with predefined endurance improvement criteria when the estimated endurance metric is larger than the current endurance metric by at least a predefined threshold amount.

In some embodiments, after reconfiguring the one or more memory portions, the storage device determines one or more updated status metrics for the one or more memory portions. For example, after reconfiguring a first block from TLC encoding format to SLC encoding format, the storage device performs an erase operation at the first block, writes test data to the first block, and then reads back the test data from the first block in order to measure an updated BER for the first block. In some embodiments, the storage device additionally or alternatively determines updated status metrics at predefined time intervals (e.g., once per day, once every two days, or once every week). In other embodiments, the storage device additionally or alternatively determines updated status metrics after a predetermined number of P/E cycles for each memory portion (e.g., after every 30, 35, 40, 45, 50, 55, 60, 65, 70, or 75 P/E cycles). In some embodiments, the storage device dynamically determines the predetermined number of P/E cycles for each memory portion while, in other embodiments, the predetermined number of P/E cycles is set by a manufacturer of the storage device based on usage histories for similar storage devices.

In some embodiments, in accordance with a determination that the one or more status metrics for a respective memory device of the one or more memory devices satisfy one or more end-of-life criteria (e.g., the over-provisioning pool has reached or is projected to reach or fall below a predefined minimum size, and/or remaining endurance of the storage device has reached or projected remaining endurance of the storage device is projected to reach or fall below a predefined minimum remaining endurance), the storage device operates (736) the respective memory device in read-only mode.

Figure 8A:
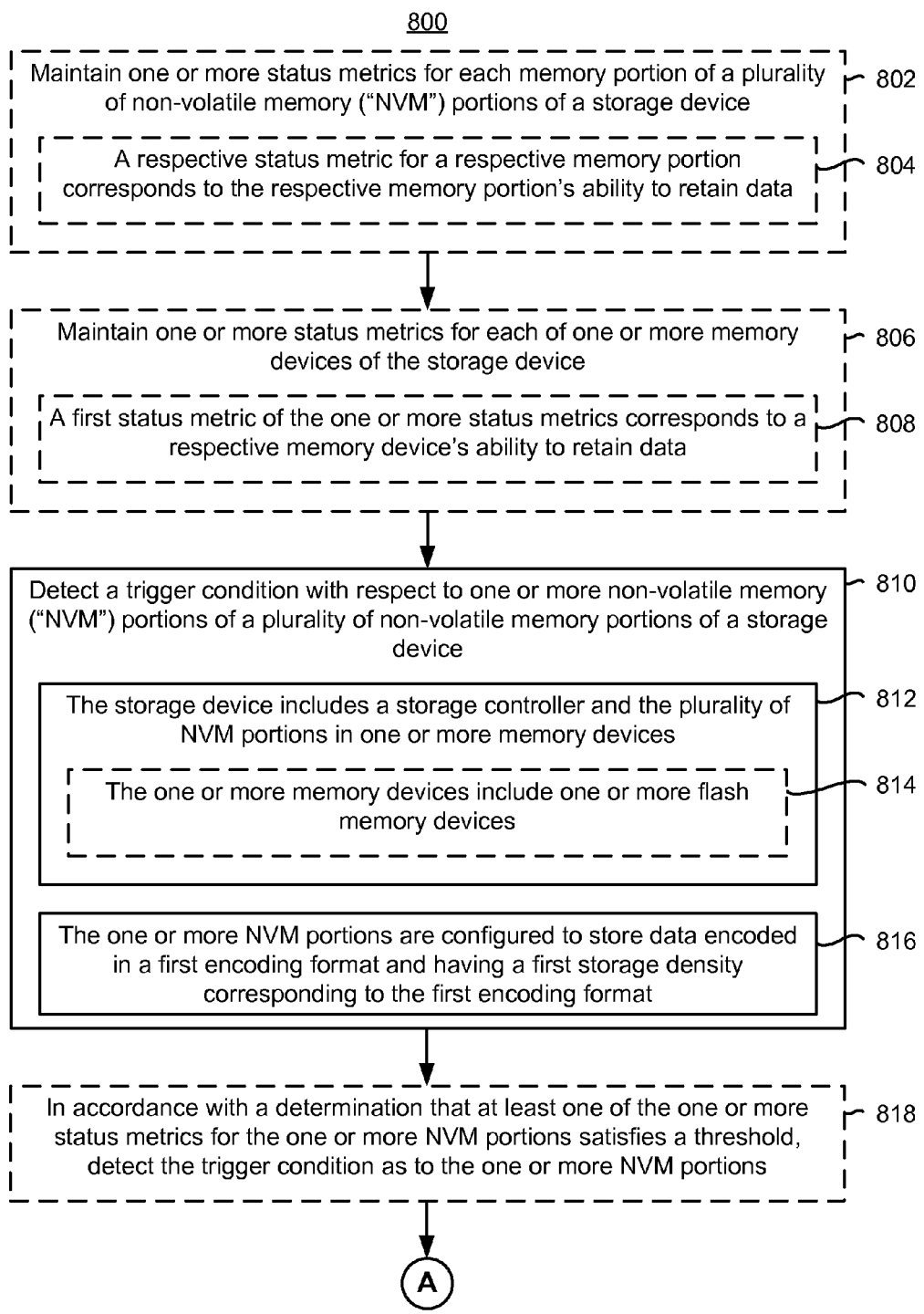
FIGS. 8A-8B illustrate flowchart representations of methods of processing storage density reconfigurations in a storage device, in accordance with some embodiments.
Figure 8B:
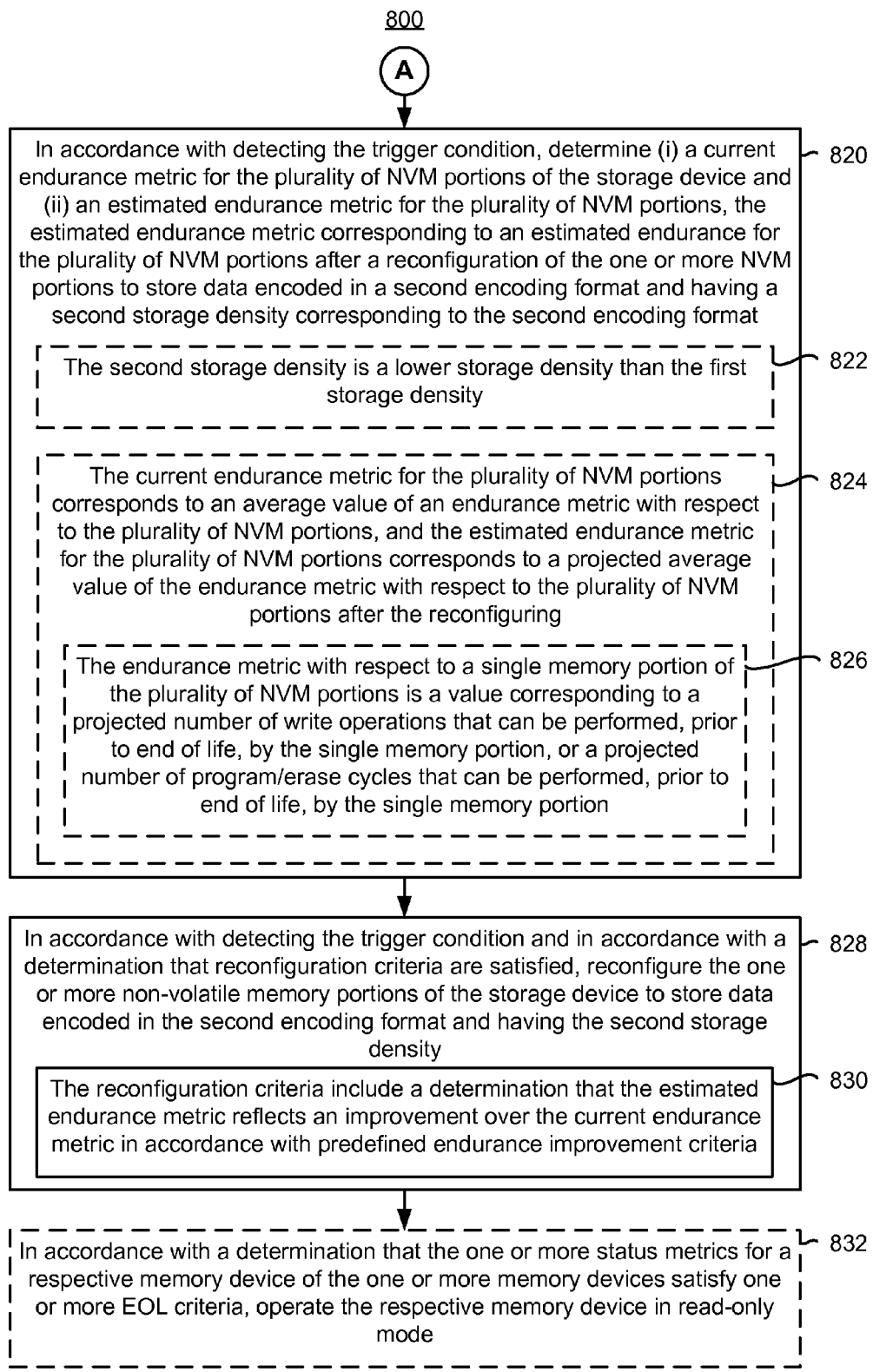

FIGS. 8A-8B illustrate flowchart representations of a method of processing storage density reconfigurations within a storage system, in accordance with some embodiments. With reference to the data storage system 100 pictured in FIG. 1, in some embodiments, a method 800 is performed by a storage device (e.g., storage device 120) or one or more components of the storage device (e.g., storage controller 124). In some embodiments, the method 800 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 800 are performed at a host system (e.g., computer system 110) that is operatively coupled with the storage device and other operations of method 800 are performed at the storage device. In some embodiments, method 800 is governed, at least in part, by instructions that are stored in a non-transitory computer-readable storage medium and that are executed by one or more processors of a host (the one or more processors of the host system are not shown in FIG. 1). For ease of explanation, the following describes method 800 as performed by the storage device (e.g., by storage controller 124 of storage device 120, FIG. 1). With reference to FIG. 2, in some embodiments, the operations of method 800 are performed, at least in part, by a metric maintaining module (e.g., metric maintaining module 224, FIG. 2), a trigger condition detection module (e.g., trigger condition detection module 228, FIG. 2), and a reconfiguration module (e.g., reconfiguration module 230, FIG. 2) of management module 121-1.

A storage device (e.g., storage device 120, FIG. 1) optionally maintains (802) one or more status metrics for each memory portion of a plurality of NVM portions (e.g., each page, block, superblock, or die plane) of the storage device. In some embodiments, a respective status metric for a respective memory portion corresponds to the respective memory portion's ability to retain data (804). In some embodiments, the storage device optionally maintains one or more status metrics for each of one or more memory devices (e.g., one or more die on one or more storage mediums 132, FIG. 1) of the storage device (806). Accordingly, in some embodiments, a first status metric of the one or more status metrics corresponds to a respective memory device's ability to retain data (808). Exemplary status metrics for memory portions and memory devices are discussed in more detail above (see, e.g., descriptions of FIGS. 3A-3C, above).

The storage device (or a component thereof, such as trigger condition detection module 228, FIG. 2) detects (810) a trigger condition with respect to one or more NVM portions of the plurality of NVM portions (e.g., one or more die plane, blocks, superblocks, pages, or other predefined NVM portions) of the storage device. The storage device includes (812) a storage controller (e.g., storage controller 124, FIG. 1) and the plurality of NVM portions in the one or more memory devices. In some embodiments, the one or more memory devices include (814) one or more flash memory devices. The one or more NVM portions are configured (816) to store data encoded in a first encoding format have a first storage density (e.g., TLC encoding format with a storage density of 3 bits per cell) corresponding to the first encoding format.

In some embodiments, in accordance with a determination that at least one of the one or more status metrics for the one or more NVM portions satisfies a threshold (818), the storage device detects the trigger condition as to the one or more NVM portions. The trigger condition can be with respect to a single memory portion (e.g., a single block) or it can be a collective trigger condition with respect to multiple memory portions that are not necessarily contiguous. The exemplary trigger conditions provided above in reference to processing step 718 of method 700 apply to processing step 818 of method 800 as well.

Turning now to FIG. 8B, in accordance with detecting the trigger condition, the storage device determines (i) a current endurance metric for the plurality of NVM portions of the storage device and (ii) an estimated endurance metric for the plurality of NVM portions, the estimated endurance metric corresponding to an estimated endurance for the plurality of NVM portions after a reconfiguration of the one or more NVM portions to store data encoded in a second encoding format and having a second storage density corresponding to the second encoding format (820). In some embodiments, the second storage density is a lower storage density than the first storage density (822). The explanations provided above in reference to processing step 728 of method 700 (e.g., regarding exemplary ways to determine the current and estimated endurance metrics) apply as well to processing step 820 of method 800.

In some embodiments, the current endurance metric for the plurality of NVM portions corresponds (824) to an average value of an endurance metric with respect to the plurality of NVM portions, and the estimated endurance metric for the plurality of NVM portions corresponds to a projected average value of the endurance metric with respect to the plurality of NVM portions after (i.e., that would result from) the reconfiguring. In some embodiments, the endurance metric with respect to a single memory portion of the plurality of NVM portions is a value corresponding (826) to a projected number of write operations that can be performed, prior to end of life, by the single memory portion, or a projected number of program/erase cycles that can be performed, prior to end of life, by the single memory portion.

In accordance with detecting the trigger condition and in accordance with a determination that reconfiguration criteria are satisfied, the storage device (or a component thereof, such as reconfiguration module 230, FIG. 2) reconfigures (828) the one or more non-volatile memory portions of the storage device to store data encoded in the second encoding format and having the second storage density. In some embodiments, the reconfiguration criteria include (830) a determination that the estimated endurance metric reflects an improvement over the current endurance metric in accordance with predefined endurance improvement criteria. In some embodiments, the estimated endurance metric comprises an improvement over the current endurance metric in accordance with predefined endurance improvement criteria when the estimated endurance metric is larger than the current endurance metric. In some other embodiments, the estimated endurance metric comprises an improvement over the current endurance metric in accordance with predefined endurance improvement criteria when the estimated endurance metric is larger than the current endurance metric by at least a predefined threshold amount.

In some embodiments, in accordance with a determination that the one or more status metrics for a respective memory device of the one or more memory devices satisfy one or more EOL criteria (e.g., remaining endurance of the storage device has reached or projected remaining endurance of the storage device is projected to reach or fall below a predefined minimum remaining endurance), the storage device operates (832) the respective memory device in read-only mode.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operation in a storage device that comprises a storage controller and a plurality of non-volatile memory portions in one or more memory devices, the method comprising:
   at the storage controller, the storage controller having one or more physical processors and memory:
      detecting a trigger condition with respect to one or more non-volatile memory portions of the storage device, wherein the one or more non-volatile memory portions are configured to store data encoded in a first encoding format and having a first storage density corresponding to the first encoding format;
   in accordance with detecting the trigger condition:
      determining a current endurance metric for the plurality of non-volatile memory portions of the storage device;
      determining an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density; and
      in accordance with a determination that reconfiguration criteria are satisfied, reconfiguring the one or more non-volatile memory portions of the storage device to store data encoded in the second encoding format and having the second storage density, the reconfiguration criteria including a determination that the estimated endurance metric comprises an improvement over the current endurance metric in accordance with predefined endurance improvement criteria.

2. The method of claim 1, wherein the second storage density is a lower storage density than the first storage density.

3. The method of claim 1, wherein the current endurance metric for the plurality of non-volatile memory portions corresponds to an average value of an endurance metric with respect to the plurality of non-volatile memory portions, and the estimated endurance metric for the plurality of non-volatile memory portions of the storage device corresponds to a projected average value of the endurance metric with respect to the plurality of non-volatile memory portions after the reconfiguring.

4. The method of claim 3, wherein the endurance metric with respect to a single memory portion of the plurality of non-volatile memory portions is a value corresponding to a projected number of write operations that can be performed, prior to end of life, by the single memory portion, or a projected number of program/erase cycles that can be performed, prior to end of life, by the single memory portion.

5. The method of claim 1, further comprising:
   maintaining one or more status metrics for each memory portion of the plurality of non-volatile memory portions of the storage device, wherein a respective status metric for a respective memory portion corresponds to the respective memory portion's ability to retain data;
   wherein detecting the trigger condition comprises:
      in accordance with a determination that at least one of the one or more status metrics for the one or more non-volatile memory portions of the storage device satisfies a threshold, detecting the trigger condition as to the one or more non-volatile memory portions of the storage device.

6. The method of claim 1, further comprising:
   maintaining one or more status metrics for each of the one or more memory devices, wherein a first status metric of the one or more status metrics corresponds to a respective memory device's ability to retain data; and
   in accordance with a determination that the one or more status metrics for a respective memory device of the one or more memory devices satisfy one or more end-of-life criteria, operating the respective memory device in read-only mode.

7. The method of claim 1, wherein the one or more memory devices comprise one or more flash memory devices.

8. A storage device, comprising:
   a set of one or more non-volatile memory devices, the set of one or more non-volatile memory devices including a plurality of non-volatile memory portions; and
   a storage controller, the storage controller including one or more controller modules configured to:
      detect a trigger condition with respect to one or more non-volatile memory portions of the storage device, wherein the one or more non-volatile memory portions are configured to store data encoded in a first encoding format and having a first storage density corresponding to the first encoding format; and
      determine an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density corresponding to the second encoding format; and
      reconfigure, in accordance with a determination that reconfiguration criteria are satisfied, the one or more non-volatile memory portions of the storage device to store data encoded in the second encoding format and having the second storage density, the reconfiguration criteria including a determination that the estimated endurance metric comprises an improvement over the current endurance metric in accordance with predefined endurance improvement criteria.

9. The storage device of claim 8, wherein the one or more controller modules include:
   a trigger condition detection module to detect the trigger condition;
   a metric maintaining module to determine the estimated endurance metric; and
   a reconfiguration module to reconfigure the one or more non-volatile memory portions of the storage device in response to the trigger condition and in accordance with the determination that the reconfiguration criteria are satisfied.

10. The storage device of claim 8, wherein the second storage density is a lower storage density than the first storage density.

11. The storage device of claim 8, wherein the current endurance metric for the plurality of non-volatile memory portions corresponds to an average value of an endurance metric with respect to the plurality of non-volatile memory portions, and the estimated endurance metric for the plurality of non-volatile memory portions of the storage device corresponds to a projected average value of the endurance metric with respect to the plurality of non-volatile memory portions after the reconfiguring.

12. The storage device of claim 11, wherein the endurance metric with respect to a single memory portion of the plurality of non-volatile memory portions is a value corresponding to a projected number of write operations that can be performed, prior to end of life, by the single memory portion, or a projected number of program/erase cycles that can be performed, prior to end of life, by the single memory portion.

13. The storage device of claim 8, wherein the one or more controller modules are further configured to:
maintain one or more status metrics for each memory portion of the plurality of non-volatile memory portions of the storage device, wherein a respective status metric for a respective memory portion corresponds to the respective memory portion's ability to retain data;
wherein detecting the trigger condition comprises:
in accordance with a determination that at least one of the one or more status metrics for the one or more non-volatile memory portions of the storage device satisfies a threshold, detecting the trigger condition as to the one or more non-volatile memory portions of the storage device.

14. The storage device of claim 8, wherein the one or more controller modules are further configured to:
maintain one or more status metrics for each of the one or more memory devices, wherein a first status metric of the one or more status metrics corresponds to a respective memory device's ability to retain data; and
in accordance with a determination that the one or more status metrics for a respective memory device of the one or more memory devices satisfy one or more end-of-life criteria, operate the respective memory device in read-only mode.

15. The storage device of claim 8, wherein the one or more memory devices comprise one or more flash memory devices.

16. A non-transitory computer readable storage medium, storing one or more programs configured for execution by one or more processors of a storage device having a set of one or more non-volatile memory devices, the set of one or more non-volatile memory devices including a plurality of non-volatile memory portions, and a storage controller, the one or more programs including instructions that when executed by the one or more processors cause the storage device to:
detect a trigger condition with respect to one or more non-volatile memory portions of the storage device, wherein the one or more non-volatile memory portions are configured to store data encoded in a first encoding format and having a first storage density corresponding to the first encoding format; and
determine an estimated endurance metric for the plurality of non-volatile memory portions of the storage device, the estimated endurance metric corresponding to an estimated endurance for the plurality of non-volatile memory portions of the storage device after a reconfiguration of the one or more non-volatile memory portions of the storage device to store data encoded in a second encoding format and having a second storage density corresponding to the second encoding format; and
reconfigure, in accordance with a determination that reconfiguration criteria are satisfied, the one or more non-volatile memory portions of the storage device to store data encoded in the second encoding format and having the second storage density, the reconfiguration criteria including a determination that the estimated endurance metric comprises an improvement over the current endurance metric in accordance with predefined endurance improvement criteria.

17. The non-transitory computer readable storage medium of claim 16, wherein the second storage density is a lower storage density than the first storage density.

18. The non-transitory computer readable storage medium of claim 16, wherein the current endurance metric for the plurality of non-volatile memory portions corresponds to an average value of an endurance metric with respect to the plurality of non-volatile memory portions, and the estimated endurance metric for the plurality of non-volatile memory portions of the storage device corresponds to a projected average value of the endurance metric with respect to the plurality of non-volatile memory portions after the reconfiguring.

19. The non-transitory computer readable storage medium of claim 18, wherein the endurance metric with respect to a single memory portion of the plurality of non-volatile memory portions is a value corresponding to a projected number of write operations that can be performed, prior to end of life, by the single memory portion, or a projected number of program/erase cycles that can be performed, prior to end of life, by the single memory portion.

20. The non-transitory computer readable storage medium of claim 16, wherein the one or more programs are further configured to:
maintaining one or more status metrics for each memory portion of the plurality of non-volatile memory portions of the storage device, wherein a respective status metric for a respective memory portion corresponds to the respective memory portion's ability to retain data;
wherein detecting the trigger condition comprises:
in accordance with a determination that at least one of the one or more status metrics for the one or more non-volatile memory portions of the storage device satisfies a threshold, detecting the trigger condition as to the one or more non-volatile memory portions of the storage device.

* * * * *